(12) United States Patent
Lim

(10) Patent No.: US 11,861,107 B2
(45) Date of Patent: Jan. 2, 2024

(54) INPUT SENSING PART AND DRIVING METHOD THEREOF

(71) Applicant: Samsung Display Co., Ltd., Yongin-Si (KR)

(72) Inventor: Sanghyun Lim, Cheonan-si (KR)

(73) Assignee: Samsung Display Co., Ltd., Yongin-Si (KR)

( * ) Notice: Subject to any disclaimer, the term of this patent is extended or adjusted under 35 U.S.C. 154(b) by 0 days.

(21) Appl. No.: 18/085,654

(22) Filed: Dec. 21, 2022

(65) Prior Publication Data

US 2023/0305655 A1  Sep. 28, 2023

(30) Foreign Application Priority Data

Mar. 10, 2022  (KR) ........................ 10-2022-0029912

(51) Int. Cl.
*G06F 3/041* (2006.01)

(52) U.S. Cl.
CPC ........ *G06F 3/04166* (2019.05); *G06F 3/0412* (2013.01)

(58) Field of Classification Search
None
See application file for complete search history.

(56) References Cited

U.S. PATENT DOCUMENTS

| 9,195,342 B2 | 11/2015 | Kim et al. | |
|---|---|---|---|
| 9,823,785 B2 | 11/2017 | Weaver et al. | |
| 10,545,589 B2 | 1/2020 | Gotoh et al. | |
| 2008/0158179 A1* | 7/2008 | Wilson | G06F 3/0446 345/173 |
| 2015/0180493 A1* | 6/2015 | Liu | H02M 3/06 324/686 |

FOREIGN PATENT DOCUMENTS

| JP | 5732155 B2 | 6/2015 |
|---|---|---|
| JP | 6900231 B2 | 7/2021 |
| KR | 10-2013-0139257 A | 12/2013 |
| KR | 10-2017-0064636 A | 6/2017 |

* cited by examiner

*Primary Examiner* — Robin J Mishler
(74) *Attorney, Agent, or Firm* — Innovation Counsel LLP

(57) ABSTRACT

Disclosed is an input sensor which includes a plurality of sensing parts, an amplifier circuit that is connected to the sensing parts, a rectifier circuit connected to the amplifier circuit, an analog-to-digital converter that is connected to the rectifier circuit, an output switching element that controls a connection of the rectifier circuit and the analog-to-digital converter, a first connection switching element that controls a connection of the amplifier circuit and the rectifier circuit, a second connection switching element that connects a first voltage line to the rectifier circuit, and a third connection switching element that connects a second voltage to be applied to the rectifier circuit.

20 Claims, 32 Drawing Sheets

INPUT SENSING PART AND DRIVING METHOD THEREOF

CROSS-REFERENCE TO RELATED APPLICATIONS

This application claims priority under 35 U.S.C. § 119 to Korean Patent Application No. 10-2022-0029912 filed on Mar. 10, 2022, in the Korean Intellectual Property Office, the disclosures of which are incorporated by reference herein in their entireties.

BACKGROUND

Embodiments of the present disclosure described herein relate to an input sensor and a driving method thereof.

An electronic device, which provides an image to a user, such as a smartphone, a digital camera, a notebook computer, a navigation system, or a smart television includes a display device for displaying an image. The display device includes a display panel for generating an image, an input device such as an input sensor, a camera for photographing (or capturing) an external image, and various sensors.

The input sensor is disposed on the display panel and senses a touch of the user as an external input. The input sensor includes a plurality of sensing parts for sensing an external input, a transfer circuit for transferring driving signals to the sensing parts, and a receive circuit for receiving sensing signals sensed by the sensing parts.

In general, an IQ demodulator is used as the receive circuit. The IQ demodulator includes complicated analog circuits and requires a lot of computation in the IQ demodulator. Accordingly, in the case where the IQ demodulator is used, the hardware of the receive circuit may become larger. Also, the IQ demodulator may use a carrier wave and an input signal (i.e., a sensing signal); however, in the case where phases of the carrier signal and the input signal are different due to the phase fluctuations, a demodulation signal may not be normally output.

There is a demand on a demodulator that is simple in circuit structure and is capable of outputting a normal demodulation signal regardless of a phase difference due to the phase fluctuations of the carrier wave and the input signal.

SUMMARY

Embodiments of the present disclosure provide an input sensor including a receive circuit outputting a normal demodulation signal by using an input signal and a driving method thereof.

According to an embodiment, an input sensor may include a plurality of sensing parts, an amplifier circuit that is connected to the sensing parts, a rectifier circuit connected to the amplifier circuit, an analog-to-digital converter that is connected to the rectifier circuit, an output switching element connected between the rectifier circuit and the analog-to-digital converter, and controlling a connection of the rectifier circuit and the analog-to-digital converter, a first connection switching element connected between the amplifier circuit and the rectifier circuit, and controlling a connection of the amplifier circuit and the rectifier circuit, a second connection switching element connected between a first voltage line supplying a first voltage and the rectifier circuit, and connecting a first voltage line to the rectifier circuit, and a third connection switching element connected between a second voltage line supplying a second voltage and the rectifier circuit and connecting a second voltage line to the rectifier circuit.

According to an embodiment, a driving method of an input sensor may include charging a first voltage in a first capacitor through a first diode connected in a forward direction, outputting a first compensation voltage charged in the first capacitor as a first compensation digital signal, storing a first threshold value obtained by subtracting a first voltage value defined as a digital value of the first voltage from the first compensation digital signal, charging a second voltage lower than the first voltage in a second capacitor through a second diode connected in a reverse direction, outputting a second compensation voltage charged in the second capacitor as a second compensation digital signal, storing a second threshold value obtained by subtracting a second voltage value defined as a digital value of the second voltage from the second compensation digital signal, charging a positive-polarity voltage of an amplified input voltage in the first capacitor through the first diode, discharging the first capacitor and the second capacitor to a reference voltage, subtracting the first threshold value from the first digital signal and outputting a result of the subtraction, charging a negative-polarity voltage of the amplified input voltage in the second capacitor through the second diode, outputting a second charging voltage charged in the second capacitor as a second digital signal, and subtracting the second threshold value from the second digital signal and outputting a result of the subtraction.

BRIEF DESCRIPTION OF THE FIGURES

The above and other objects and features of the present disclosure will become apparent by describing in detail embodiments thereof with reference to the accompanying drawings.

DETAILED DESCRIPTION

Figure 1:
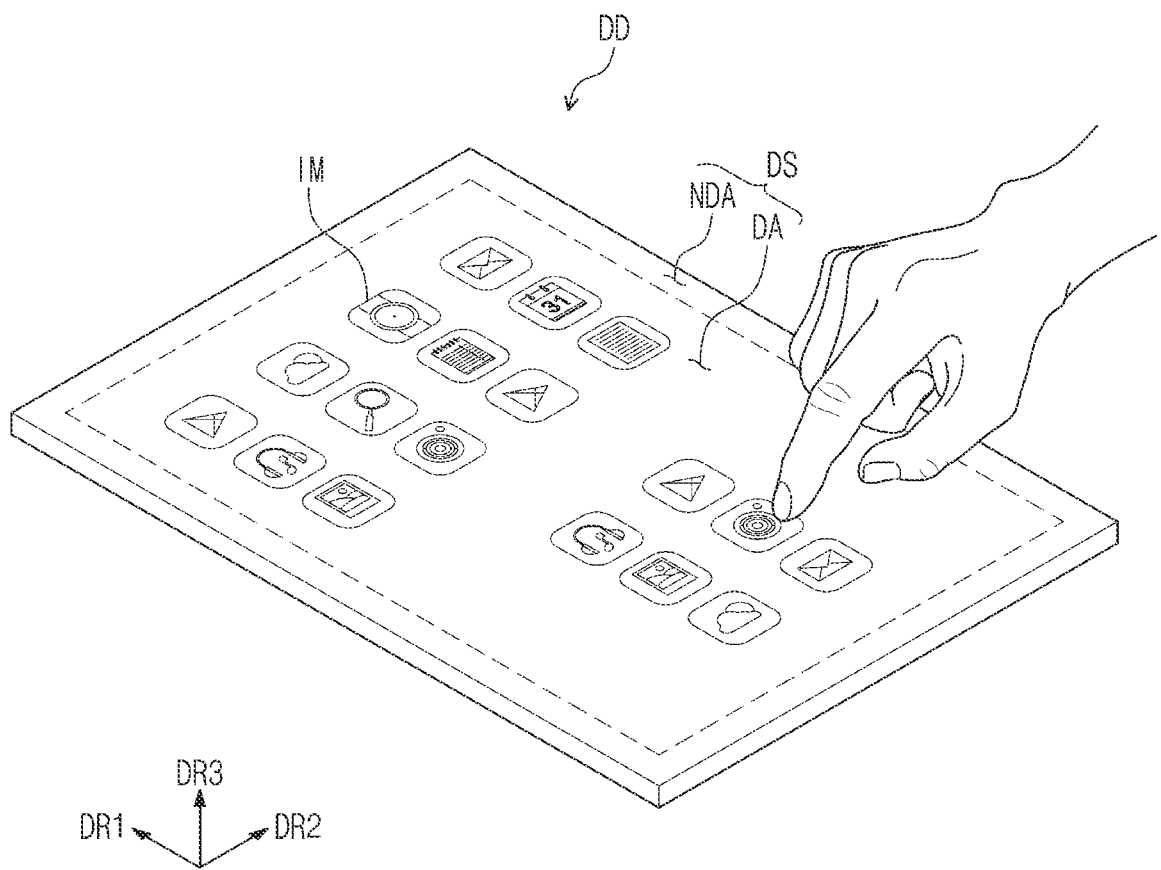
FIG. 1 is a perspective view of a display device according to an embodiment of the present disclosure.

In the specification, when one component (or area, layer, part, or the like) is referred to as being "on", "connected to", or "coupled to" another component, it should be understood that the former may be directly on, connected to, or coupled to the latter, and also may be on, connected to, or coupled to the latter via a third intervening component.

Like reference numerals refer to like components. In addition, in drawings, thicknesses, proportions, and dimensions of components may be exaggerated to describe the technical features effectively.

The term "and/or" includes one or more combinations of the associated listed items.

The terms "first", "second", etc. are used to describe various components, but the components are not limited by the terms. The terms are only used to distinguish one component from another component. For example, without departing from the scope and spirit of the inventive concept, a first component may be referred to as a "second component", and similarly, the second component may be referred to as the "first component". The singular forms are intended to include the plural forms unless the context clearly indicates otherwise.

Also, the terms "under", "beneath", "on", "above", etc. are used to describe a relationship between components illustrated in a drawing. The terms are relative and are described with reference to a direction indicated in the drawing.

Unless otherwise defined, all terms (including technical terms and scientific terms) used in this specification have the same meaning as commonly understood by those skilled in the art to which the present disclosure belongs. Furthermore, terms such as terms defined in the dictionaries commonly used should be interpreted as having a meaning consistent with the meaning in the context of the related technology, and should not be interpreted in ideal or overly formal meanings unless explicitly defined herein.

It will be further understood that the terms "comprises", "includes", "have", etc. specify the presence of stated features, numbers, steps, operations, elements, components, or a combination thereof but do not preclude the presence or addition of one or more other features, numbers, steps, operations, elements, components, or a combination thereof.

Below, embodiments of the present disclosure will be described with reference to accompanying drawings.

FIG. 1 is a perspective view of a display device according to an embodiment of the present disclosure.

Referring to FIG. 1, a display device DD according to an embodiment of the present disclosure may be in the shape of a rectangle having long sides (or edges) extending in a first direction DR1 and short sides (or edges) extending in a second direction DR2 intersecting the first direction DR1. However, the present disclosure is not limited thereto. For example, the display device DD may have various shapes such as a circle or a polygon.

Hereinafter, a direction that is substantially perpendicular to a plane defined by the first direction DR1 and the second direction DR2 is defined as a third direction DR3. Also, in the specification, the expression "when viewed from above a plane" may mean "when viewed in the third direction DR3".

An upper surface of the display device DD may be defined as a display surface DS and may have a plane defined by the first direction DR1 and the second direction DR2. Images IM generated by the display device DD may be provided to a user through the display surface DS.

The display surface DS may include a display area DA and a non-display area NDA around the display area DA. The display area DA may display an image and the non-display area NDA may not display an image. The non-display area NDA may surround the display area DA and may define a border of the display device DD printed with a given color.

Figure 2:
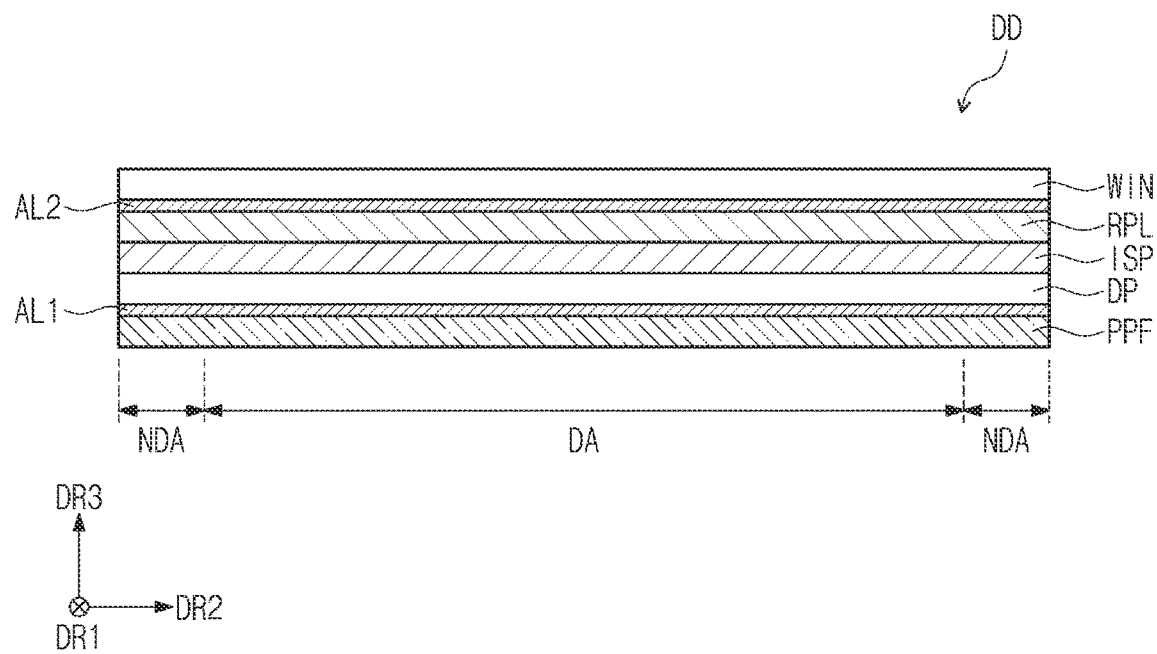
FIG. 2 is a diagram illustrating an example of a cross section of a display device illustrated in FIG. 1.

FIG. 2 is a diagram illustrating an example of a cross section of a display device illustrated in FIG. 1.

FIG. 2 illustrates a cross-section of the display device DD when viewed in the first direction DR1.

Referring to FIG. 2, the display device DD may include a display panel DP, an input sensor ISP, an anti-reflection layer RPL, a window WIN, a panel protection film PPF, and first and second adhesive layers AL1 and AL2.

The display panel DP may be a flexible display panel. The display panel DP according to an embodiment of the present disclosure may be a light emitting display panel, but the display panel DP is not particularly limited thereto. For example, the display panel DP may be an organic light emitting display panel or an inorganic light emitting display panel. An emission layer of the organic light emitting display panel may include an organic light emitting material. An emission layer of the inorganic light emitting display panel may include a quantum dot, a quantum rod, or the like. Below, the description will be given under the condition that the display panel DP is an organic light emitting display panel.

The input sensor ISP may be disposed on the display panel DP. The input sensor ISP may include a plurality of sensors (not illustrated) for sensing an external input in a capacitive scheme. The input sensor ISP may be directly manufactured on the display panel DP in the process of manufacturing the display device DD. However, the present disclosure is not limited thereto. For example, the input sensor ISP may be manufactured with a panel independent of the display panel DP and may be bonded to the display panel DP by an adhesive layer.

The anti-reflection layer RPL may be disposed on the input sensor ISP. The anti-reflection layer RPL may be directly manufactured on the input sensor ISP in the process of manufacturing the display device DD. However, the present disclosure is not limited thereto. For example, the anti-reflection layer RPL may be manufactured with a separate panel and may be bonded to the input sensor ISP by an adhesive layer.

The anti-reflection layer RPL may include a film for preventing an external light from being reflected. The anti-reflection layer RPL may reduce the reflectance of the external light incident from above the display device DD toward the display panel DP. As the anti-reflection layer RPL is provided, the external light may not be visually perceived by the user.

When the external light traveling toward the display panel DP is reflected from the display panel DP and is again provided to an external user, the user may visually perceive the external light, like a mirror. To prevent the issue, the anti-reflection layer RPL may include a plurality of color filters displaying the same colors as pixels of the display panel DP.

The color filters may filter an external light with the same colors as the pixels. In this case, the external light may not be visually perceived by the user. However, the present disclosure is not limited thereto. For example, the anti-reflection layer RPL may include a retarder and/or a polarizer for the purpose of reducing the reflectance of the external light.

The window WIN may be disposed on the anti-reflection layer RPL. The window WIN may protect the display panel DP, the input sensor ISP, and the anti-reflection layer RPL from external scratches and impacts.

The panel protection film PPF may be disposed under the display panel DP. The panel protection film PPF may protect a lower portion (or a lower surface) of the display panel DP. The panel protection film PPF may include a flexible plastic material such as Polyethyleneterephthalate (PET).

The first adhesive layer AL1 may be interposed between the display panel DP and the panel protection film PPF, and the display panel DP and the panel protection film PPF may be bonded to each other by the first adhesive layer AL1. The second adhesive layer AL2 may be interposed between the window WIN and the anti-reflection layer RPL, and the window WIN and the anti-reflection layer RPL may be bonded to each other by the second adhesive layer AL2.

Figure 3:
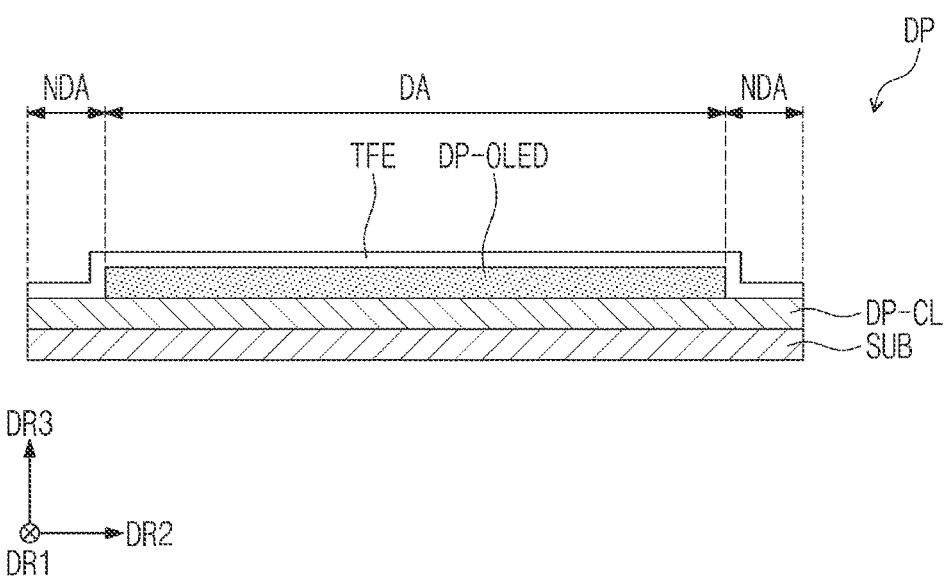
FIG. 3 is a view illustrating an example of a cross section of a display panel illustrated in FIG. 2.

FIG. 3 is a view illustrating an example of a cross section of a display panel illustrated in FIG. 2.

In an embodiment, FIG. 3 shows the cross section of the display panel DP when viewed in the first direction DR1.

Referring to FIG. 3, the display panel DP may include a substrate SUB, a circuit element layer DP-CL disposed on the substrate SUB, a display element layer DP-OLED disposed on the circuit element layer DP-CL, and a thin film encapsulation layer TFE disposed on the display element layer DP-OLED.

The substrate SUB may include the display area DA and the non-display area NDA surrounding the display area DA. The substrate SUB may include a glass or a flexible plastic material such as polyimide (PI). The display element layer DP-OLED may be disposed in the display area DA A plurality of pixels may be disposed in the circuit element layer DP-CL and the display element layer DP-OLED. Each of the pixels may include transistors disposed in the circuit element layer DP-CL and a light emitting device disposed in the display element layer DP-OLED and connected to the transistors.

The thin film encapsulation layer TFE may be disposed on the circuit element layer DP-CL so as to cover the display element layer DP-OLED. The thin film encapsulation layer TFE may protect the pixels from moisture, oxygen, and external foreign objects.

Figure 4:
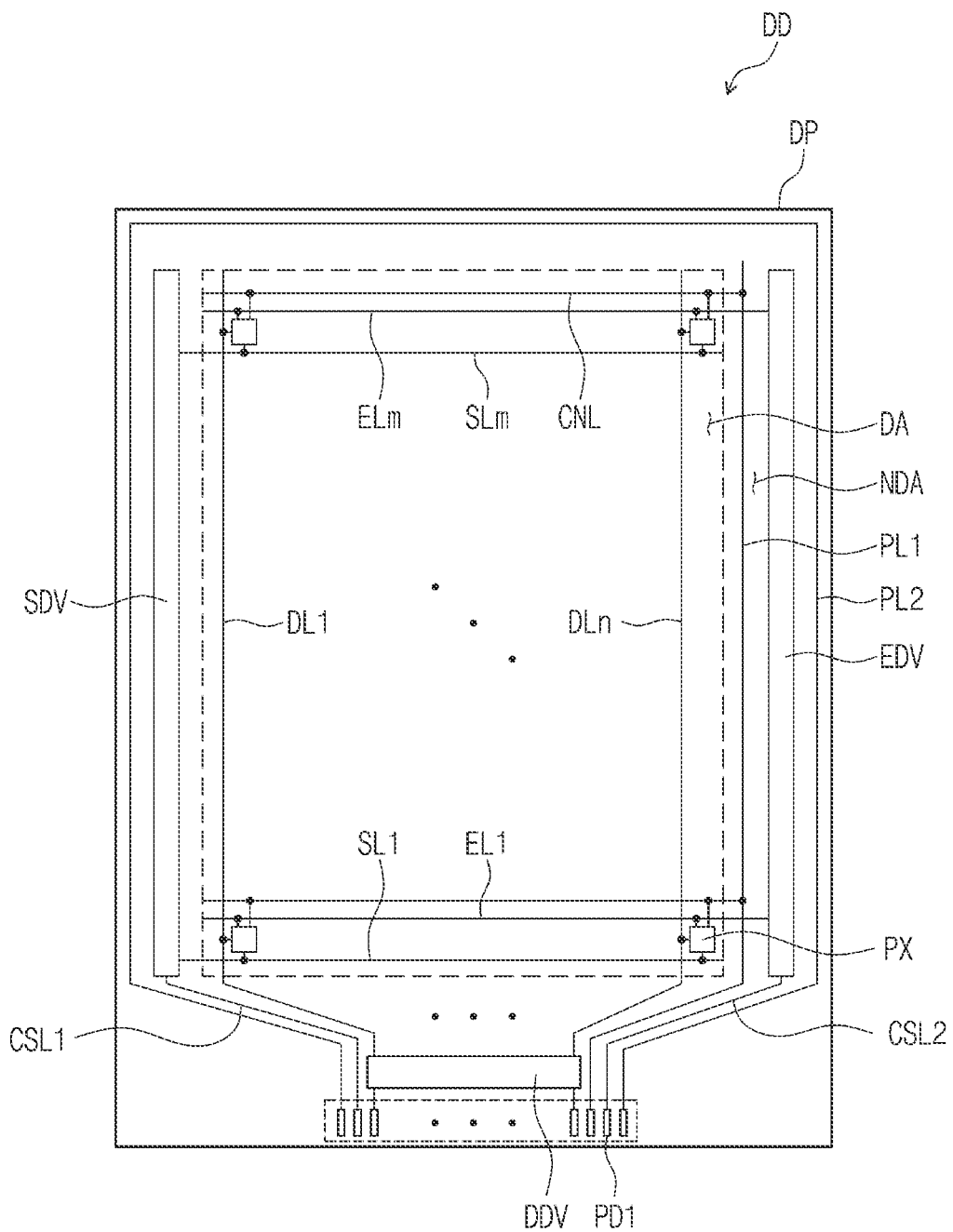
FIG. 4 is a plan view of a display panel illustrated in FIG. 2.

FIG. 4 is a plan view of a display panel illustrated in FIG. 2.

Referring to FIG. 4, the display device DD may include the display panel DP, a scan driver SDV, a data driver DDV, a light emission driver EDV, and a plurality of first pads PD1.

The display panel DP may be in the shape of a rectangle having long sides extending in the first direction DR1 and short sides extending in the second direction DR2. However, the shape of the display panel DP is not limited thereto. The display panel DP may include the display area DA and the non-display area NDA surrounding the display area DA.

The display panel DP may include a plurality of pixels PX, a plurality of scan lines SL1 to SLm, a plurality of data lines DL1 to DLn, a plurality of light emission lines EL1 to ELm, first and second control lines CSL1 and CSL2, first and second power supply lines PL1 and PL2, and connecting lines CNL. Herein, m and n are a natural number.

The pixels PX may be arranged in the display area DA. The scan driver SDV and the light emission driver EDV may be disposed in the non-display area NDA so as to be adjacent to the long sides of the display panel DP, respectively. The data driver DDV may be disposed in the non-display area NDA so as to be adjacent to one of the short sides of the display panel DP. In a plan view, the data driver DDV may be disposed adjacent to a lower end of the display panel DP.

The scan lines SL1 to SLm may extend in the second direction DR2 and may be connected to the pixels PX and the scan driver SDV. The data lines DL1 to DLn may extend in the first direction DR1 and may be connected to the pixels PX and the data driver DDV. The light emission lines EL1 to ELm may extend in the second direction DR2 and may be connected to the pixels PX and the light emission driver EDV.

The first power supply line PL1 may extend in the first direction DR1 and may be disposed in the non-display area NDA. The first power supply line PL1 may be interposed between the display area DA and the light emission driver EDV.

The connecting lines CNL may extend in the second direction DR2, may be arranged in the first direction DR1, and may be connected to the first power supply line PL1 and the pixels PX. A first voltage may be applied to the pixels PX through the first power supply line PL1 and the connecting lines CNL that are connected to each other.

The second power supply line PL2 may be disposed in the non-display area NDA and may extend along the long sides of the display panel DP and one short side of the display panel DP at which the data driver DDV is not disposed. The second power supply line PL2 may be disposed to surround the scan driver SDV and the light emission driver EDV.

Although not illustrated, the second power supply line PL2 may extend toward the display area DA and may be connected to the pixels PX. A second voltage that is lower than the first voltage may be applied to the pixels PX through the second power supply line PL2.

The first control line CSL1 may be connected to the scan driver SDV and may extend toward the lower end of the display panel DP. The second control line CSL2 may be connected to the light emission driver EDV and may extend toward the lower end of the display panel DP. The data driver DDV may be interposed between the first control line CSL1 and the second control line CSL2.

The first pads PD1 may be disposed in the non-display area NDA so as to be adjacent to the lower end of the display panel DP and may be closer to the lower end of the display panel DP than the data driver DDV. The data driver DDV, the first power supply line PL1, the second power supply line PL2, the first control line CSL1, and the second control line CSL2 may be connected to respective first pads PD1. The data lines DL1 to DLn may be connected to the data driver DDV, and the data driver DDV may be connected to respective first pads PD1 corresponding to the data lines DL1 to DLn.

Although not illustrated, the display device DD may further include a timing controller for controlling operations of the scan driver SDV, the data driver DDV, and the light emission driver EDV, and a voltage generator (not shown) for generating the first and second voltages. The timing controller and the voltage generator may be connected to respective first pads PD1 through a printed circuit board.

The scan driver SDV may generate a plurality of scan signals, and the plurality of scan signals may be applied to the pixels PX through the scan lines SL1 to SLm. The data driver DDV may generate a plurality of data voltages, and the plurality of data voltages may be applied to the pixels PX through the data lines DL1 to DLn. The light emission driver EDV may generate a plurality of light emission signals, and the plurality of light emission signals may be applied to the pixels PX through the light emission lines EL1 to ELm.

The pixels PX may be provided with the data voltages in response to the scan signals. The pixels PX may display an image by emitting light of luminance corresponding to the data voltages in response to the light emission signals.

Figure 5:
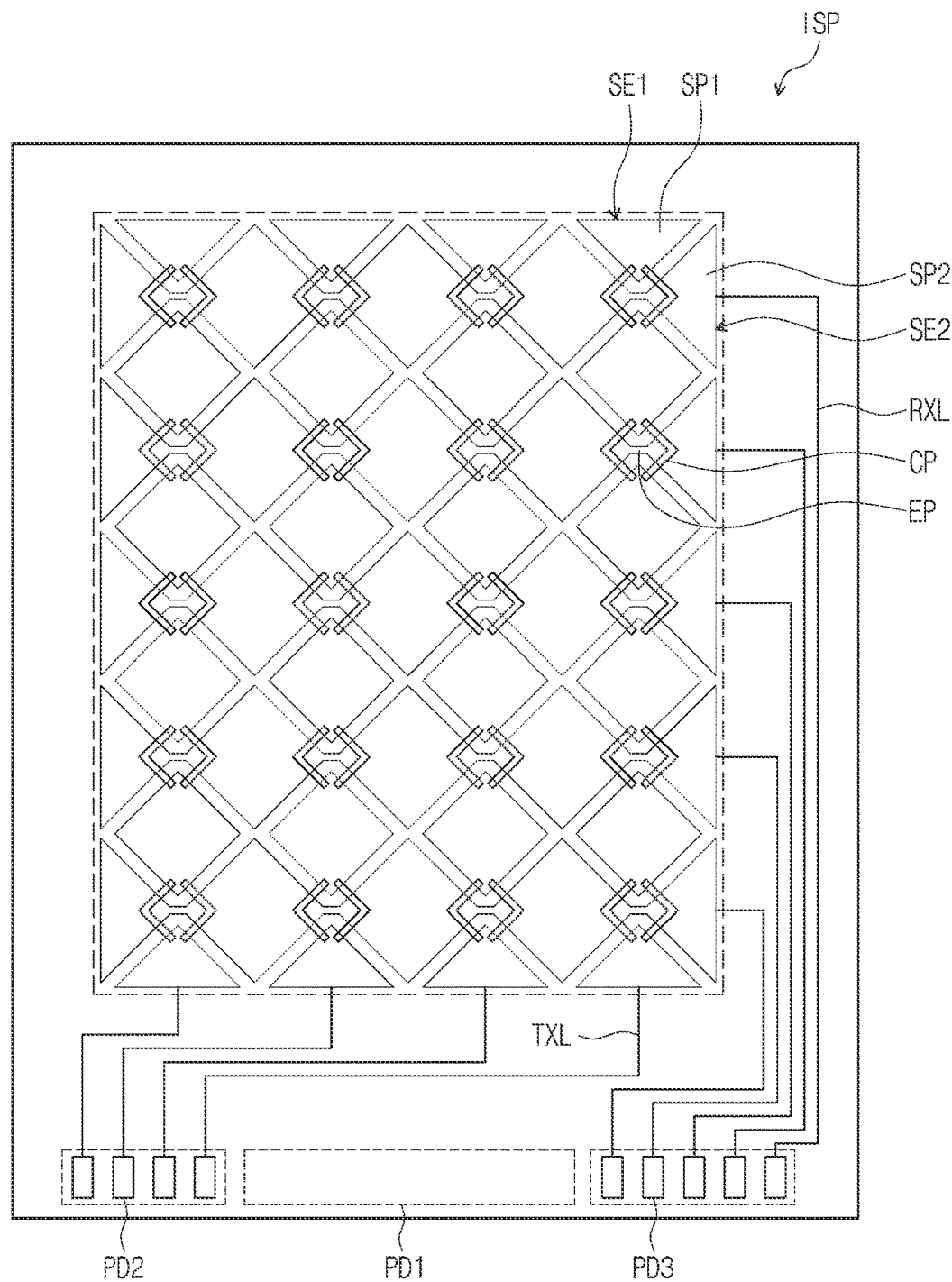
FIG. 5 is a plan view of an input sensor illustrated in FIG. 2.

FIG. 5 is a plan view of an input sensor illustrated in FIG. 2.

Referring to FIG. 5, the input sensor ISP may include a plurality of sensing electrodes SE1 and SE2, a plurality of lines TXL and RXL, and a plurality of second and third pads PD2 and PD3. The sensing electrodes SE1 and SE2, the lines TXL and RXL, and the second and third pads PD2 and PD3 may be disposed on the thin film encapsulation layer TFE of the display panel DP.

A planar area of the input sensor ISP may include an active area AA (refer to FIG. 6) and a non-active area NAA (refer to FIG. 6) around the active area AA. The active area AA may overlap the display area DA, and the non-active area NAA may overlap the non-display area NDA in a plan view.

The sensing electrodes SE1 and SE2 may be disposed in the active area AA, and the second and third pads PD2 and PD3 may be disposed in the non-active area NAA. In a plan view, the second pads PD2 and the third pads PD3 may be disposed adjacent to a lower end of the input sensor ISP. In a plan view, the first pads PD1 may be interposed between the second pads PD2 and the third pads PD3.

The lines TXL and RXL may be connected to first ends of the sensing electrodes SE1 and SE2 and may extend to the non-active area NAA so as to be connected to the second and third pads PD2 and PD3, respectively. Although not illustrated, a sensing control part for controlling the input sensor ISP may be connected to the second and third pads PD2 and PD3 through a printed circuit board.

The sensing electrodes SE1 and SE2 may include the plurality of first sensing electrodes SE1 extending in the first direction DR1 and arranged in the second direction DR2, and the plurality of second sensing electrodes SE2 extending in the second direction DR2 and arranged in the first direction DR1. The second sensing electrodes SE2 may be insulated from the first sensing electrodes SE1 and may extend to intersect the first sensing electrodes SE1.

The lines TXL and RXL may include the plurality of first signal lines TXL connected to the first sensing electrodes SE1 and the plurality of second signal lines RXL connected to the second sensing electrodes SE2. The first signal lines TXL may extend to the non-active area NAA and may be connected to the second pads PD2. The second signal lines RXL may extend to the non-active area NAA and may be connected to the third pads PD3.

In an embodiment, in a plan view, the first signal lines TXL may be disposed in the non-active area NAA disposed adjacent to a lower side of the active area AA. Also, in a plan view, the second signal lines RXL may be disposed in the non-active area NAA disposed adjacent to a right side of the active area AA.

Each of the first sensing electrodes SE1 may include a plurality of first sensing parts SP1 arranged in the first direction DR1 and a plurality of connecting patterns CP connecting the first sensing parts SP1. Each of the connecting patterns CP may overlap a second sensing part SP2 disposed between the first sensing parts SP1 along the first direction DR1 and may connect the first sensing parts SP1 disposed adjacent to each other in the first direction DR1.

Each of the connecting patterns CP may be interposed between two first sensing parts SP1 adjacent in the first direction DR1 and may connect the two first sensing parts SP1. For example, an insulating layer (not illustrated) may be interposed between the connecting patterns CP and the first sensing parts SP1, and the connecting patterns CP may be connected to the first sensing parts SP1 through contact holes defined in the insulating layer.

Each of the second sensing electrodes SE2 may include the plurality of second sensing parts SP2 arranged in the second direction DR2 and a plurality of extending patterns EP connecting the plurality of second sensing parts SP2 adjacent to each other. In each of the second sensing electrodes SE2, the extending patterns EP and the second sensing electrodes SE2 may be integrally formed. Each of the extending patterns EP may be interposed between two second sensing parts SP2 adjacent in the second direction DR2 and may extend from the two second sensing parts SP2.

The first sensing parts SP1 and the second sensing parts SP2 may not overlap each other and may be spaced from each other; in this case, the first sensing parts SP1 and the second sensing parts SP2 may be alternately arranged. Capacitances may be formed by the first sensing parts SP1 and the second sensing parts SP2. In a plan view, the extending patterns EP may be disposed between the connecting patterns CP and may not overlap the connecting patterns CP.

The first and second sensing parts SP1 and SP2 and the extending patterns EP may be disposed in the same layer. The connecting patterns CP may be disposed in a layer different from that of the first and second sensing parts SP1 and SP2 and the extending patterns EP.

Figure 6:
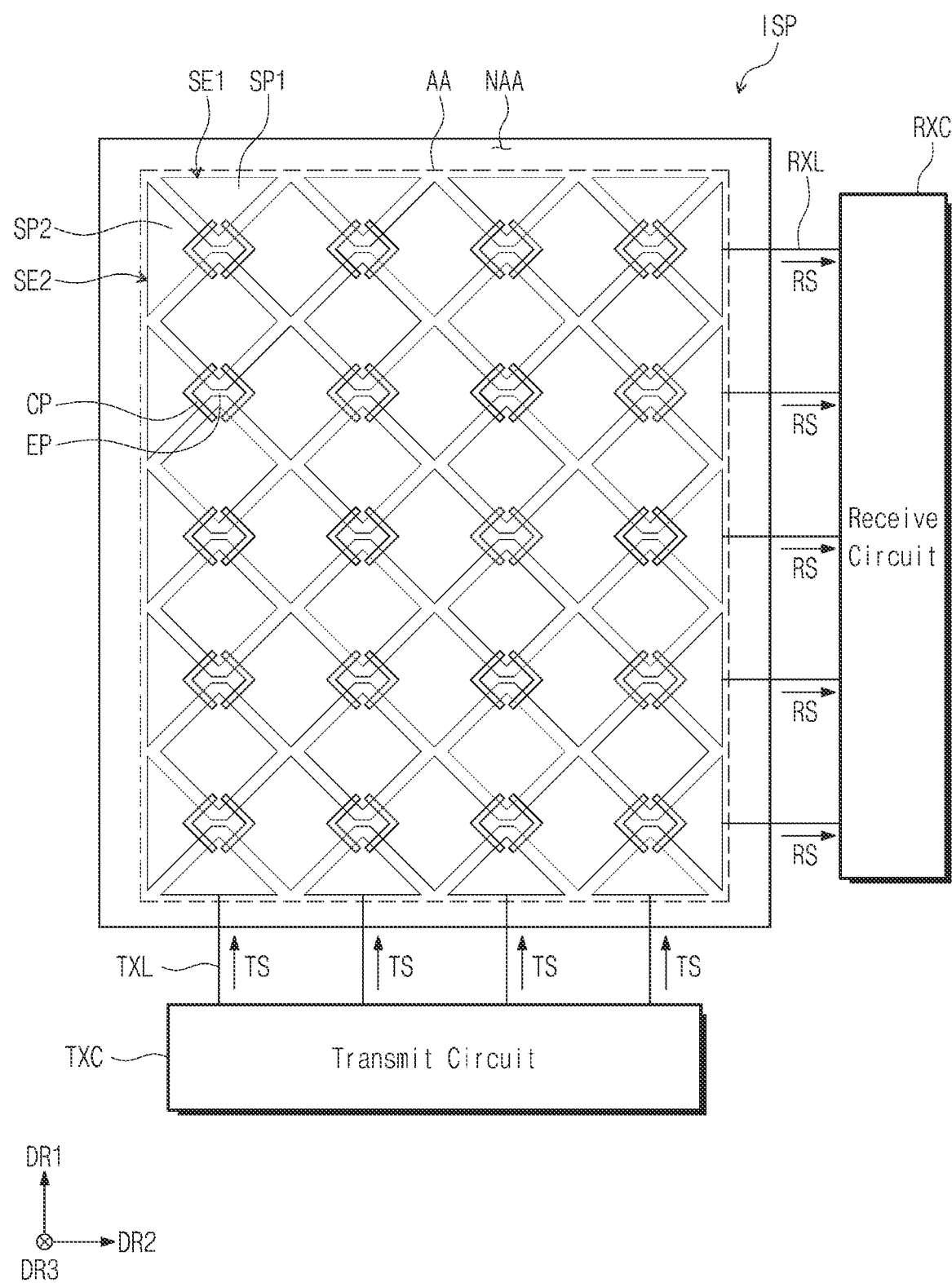
FIG. 6 is a diagram illustrating a driving part of an input sensor of FIG. 5, which is connected to sensing parts of the input sensor.

FIG. 6 is a diagram illustrating a driving part of an input sensor of FIG. 5, which is connected to sensing parts of the input sensor.

In an embodiment, compared to FIG. 5, the non-active area NAA of FIG. 6 is reduced, and the first and second lines TXL and RXL are illustrated in a state of extending to the outside of the non-active area NAA and being connected to a transmit circuit TXC and a receive circuit RXC.

Referring to FIG. 6, the input sensor ISP may include the transmit circuit TXC and the receive circuit RXC that constitute the driving part for driving the first sensing electrodes SE1 and the second sensing electrodes SE2. The transmit circuit TXC may apply driving signals TS to the first lines TXL. The driving signals TS may be applied to the first sensing electrodes SE1 through the first lines TXL.

A touch of the user may be sensed by the first sensing electrodes SE1 and the second sensing electrodes SE2. Capacitances of the first and second sensing electrodes SE1 and SE2, which are changed by the user touch, may be output through the second lines RXL as sensing signals RS.

The sensing signals RS may be provided to the receive circuit RXC through the second lines RXL. The receive circuit RXC may amplify and demodulate a sensing signal so as to be converted into a digital signal. A signal output from the receive circuit RXC may be used to calculate touch coordinates at an external control module (not illustrated).

Figure 7:
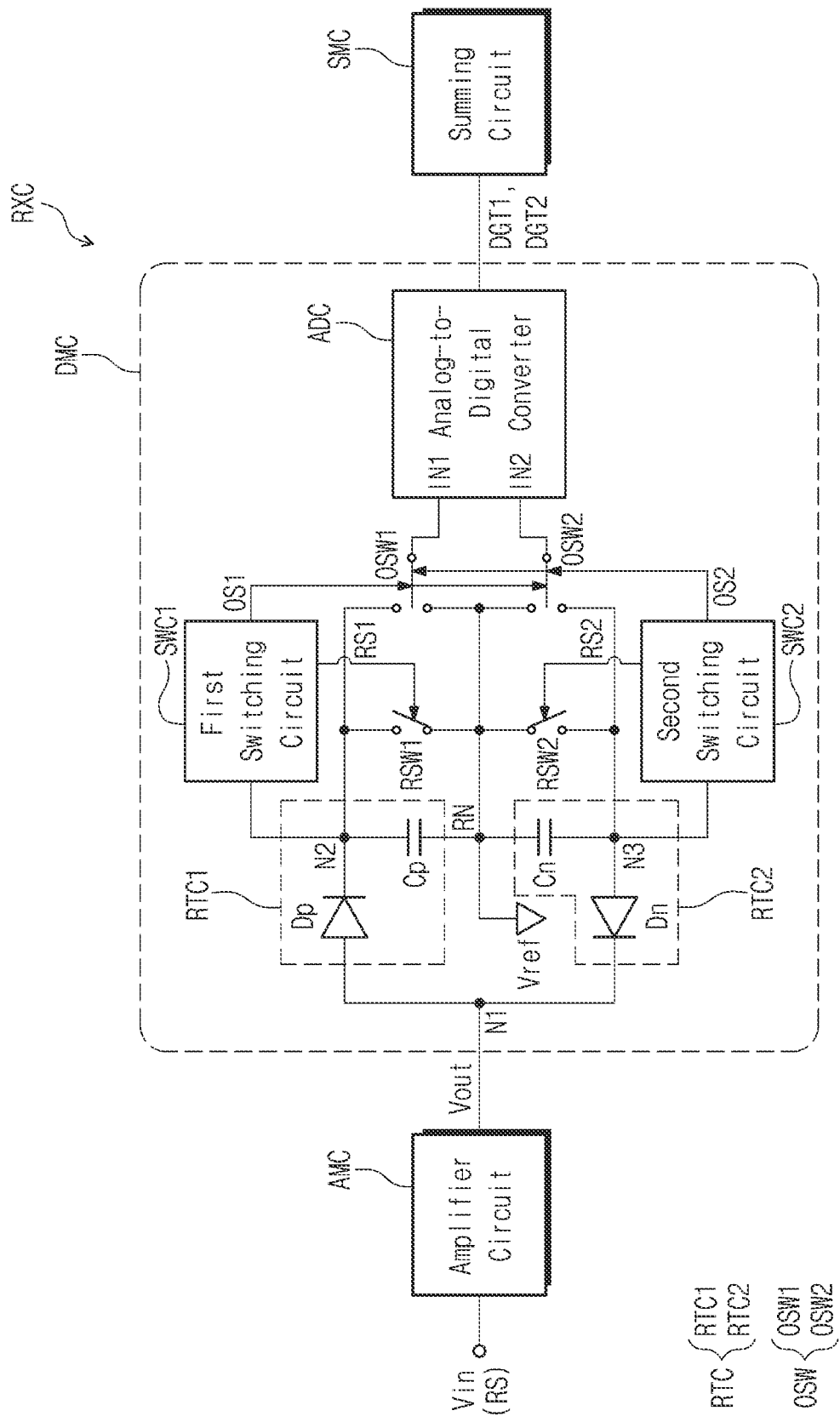
FIG. 7 is a diagram illustrating a configuration of a receive circuit illustrated in FIG. 6.
Figure 8A:
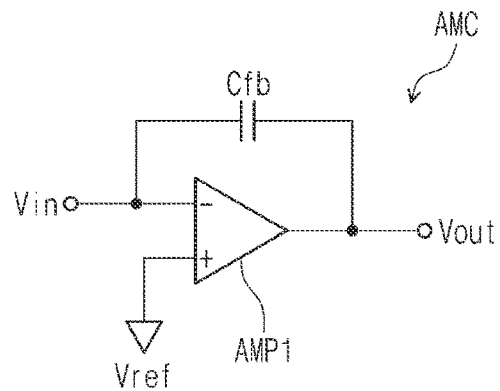
FIGS. 8A, 8B and 8C are diagrams illustrating various embodiments of an amplifier circuit illustrated in FIG. 7.
Figure 8B:
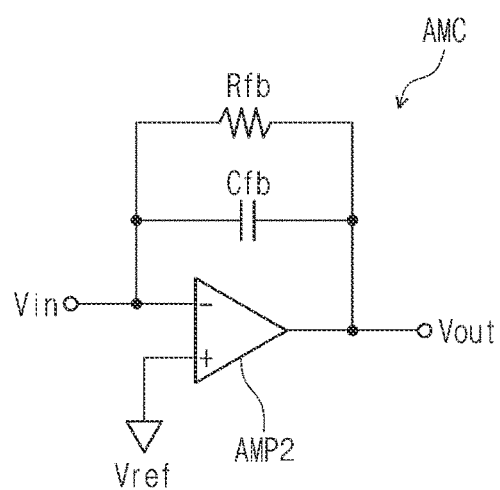
Figure 8C:
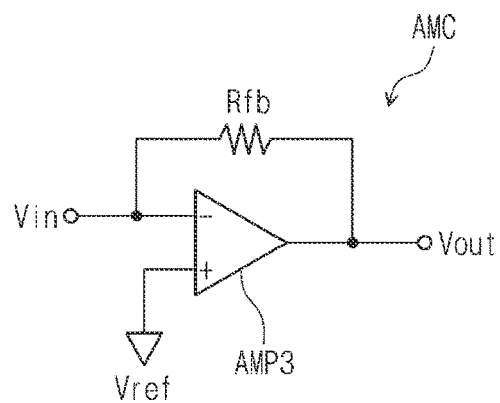
Figure 9:
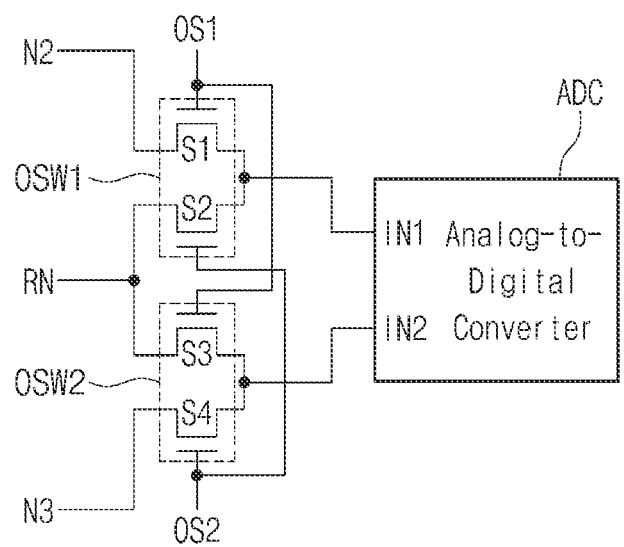
FIG. 9 is a diagram illustrating a configuration of a switching element illustrated in FIG. 7 in detail.

FIG. 7 is a diagram illustrating a configuration of a receive circuit illustrated in FIG. 6. FIGS. 8A to 8C are diagrams illustrating various embodiments of an amplifier circuit illustrated in FIG. 7. FIG. 9 is a diagram illustrating a configuration of a switching element illustrated in FIG. 7 in detail.

Referring to FIG. 7, the receive circuit RXC may include an amplifier circuit AMC, a demodulating circuit DMC connected to the amplifier circuit AMC, and a summing circuit SMC connected to the demodulating circuit DMC.

The circuit illustrated in FIG. 7 may be a configuration connected to one of the second sensing electrodes SE2 illustrated in FIG. 6. That is, the receiving circuits RXC may include a plurality of the amplifier circuits AMC and a plurality of demodulating circuits DMC each connected to the second sensing electrodes SE2 illustrated in FIG. 6, respectively. Accordingly, the amplifier circuit AMC illustrated in FIG. 7 may be connected to one of the second sensing electrodes SE2 illustrated in FIG. 6.

The sensing signal RS illustrated in FIG. 6 may be provided to the amplifier circuit AMC as an input signal Vin. The input signal Vin may be a modulation signal. The amplifier circuit AMC may amplify the input signal Vin and output an output signal Vout which is amplified to the demodulating circuit DMC. The demodulating circuit DMC may output a demodulation signal to a summing circuit SMC.

Referring to FIGS. 8A to 8C, the amplifier circuit AMC may include various amplifiers AMP1, AMP2, and AMP3. The amplifiers AMP1, AMP2, and AMP3 may be inverting amplifiers.

Referring to FIG. 8A, the amplifier circuit AMC may include the amplifier AMP1 and a capacitor Cfb. The capacitor Cfb may be connected to a negative input terminal (−) of the amplifier AMP1 and an output terminal of the amplifier AMP1.

The input signal Vin may be input to the negative input terminal (−) of the amplifier AMP1, and a positive input terminal (+) of the amplifier AMP1 may receive a reference voltage Vref. The amplifier AMP1 may amplify the input signal Vin such that a polarity of the input signal Vin is inverted and may output an amplified input signal as the output signal Vout.

Referring to FIG. 8B, the amplifier circuit AMC may include the amplifier AMP2, the capacitor Cfb, and a resistor Rfb. The capacitor Cfb may be connected to a negative input terminal (−) of the amplifier AMP2 and an output terminal of the amplifier AMP2. The resistor Rfb may be connected to the negative input terminal (−) of the amplifier AMP2 and the output terminal of the amplifier AMP2. The resistor Rfb and the capacitor Cfb may be connected in parallel.

The input signal Vin may be input to the negative input terminal (−) of the amplifier AMP2, and a positive input terminal (+) of the amplifier AMP2 may receive the reference voltage Vref. The amplifier AMP2 may amplify the input signal Vin such that a polarity of the input signal Vin is inverted and may output an amplified input signal as the output signal Vout.

Referring to FIG. 8C, the amplifier circuit AMC may include the amplifier AMP3 and the resistor Rfb. The resistor Rfb may be connected to a negative input terminal (−) of the amplifier AMP3 and an output terminal of the amplifier AMP3.

The input signal Vin may be input to the negative input terminal (−) of the amplifier AMP3, and a positive input terminal (+) of the amplifier AMP3 may receive the reference voltage Vref. The amplifier AMP3 may amplify the input signal Vin such that a polarity of the input signal Vin is inverted and may output an amplified input signal as the output signal Vout.

Referring to FIG. 7, an output terminal of the amplifier circuit AMC may be connected to a first node N1 of the demodulating circuit DMC. The output signal Vout output from the amplifier circuit AMC may be applied to the first node N1.

The demodulating circuit DMC may include a rectifier circuit RTC, an analog-to-digital converter ADC, an output switching element OSW, first and second reset switching elements RSW1 and RSW2, and first and second switching circuit SWC1 and SWC2.

The rectifier circuit RTC may be connected to the first node N1, that is, may be connected to the amplifier circuit AMC through the first node N1. The rectifier circuit RTC may receive the output signal Vout from the amplifier circuit AMC through the first node N1.

The rectifier circuit RTC may perform a rectifying operation on a voltage of the first node N1. The driving signal TS and the sensing signal RS may be sinusoidal signals; accordingly, the input signal Vin, the output signal Vout, and the voltage of the first node N1 may also be in the form of a sine wave. The rectifier circuit RTC may convert a positive-polarity voltage and a negative-polarity voltage of a sinusoidal signal into DC voltages. The above operations will be described in detail later.

The analog-to-digital converter ADC may be connected to the rectifier circuit RTC and the summing circuit SMC. An input terminal of the analog-to-digital converter ADC may be connected to the rectifier circuit RTC, and an output terminal of the analog-to-digital converter ADC may be connected to the summing circuit SMC. The analog-to-digital converter ADC may be connected to the rectifier circuit RTC through the output switching element OSW.

The analog-to-digital converter ADC may receive a signal output from the rectifier circuit RTC and may convert the received signal into a digital signal. The analog-to-digital converter ADC may provide the digital signal to the summing circuit SMC.

The rectifier circuit RTC may include a first rectifier circuit RTC1 connected between the first node N1 and a second node N2 and a second rectifier circuit RTC2 connected between the first node N1 and a third node N3. The first rectifier circuit RTC1 may include a first diode Dp connected between the first node N1 to the second node N2 in a forward direction. The second rectifier circuit RTC2 may include a second diode Dn connected between the first node N1 and the third node N3 in a reverse (or backward) direction.

The first rectifier circuit RTC1 may include a first diode Dp and a first capacitor Cp. The first diode Dp may be connected between the first node N1 and the second node N2 in a forward direction. For example, an anode of the first diode Dp may be connected to the first node N1 and a cathode of the first diode Dp may be connected to the second node N2. The first capacitor Cp may include a first electrode connected to the second node N2 and a second electrode connected to a reference node RN to which the reference voltage Vref is applied.

The second rectifier circuit RTC2 may include a second diode Dn and a second capacitor Cn. The second diode Dn may be connected between the first node N1 and the third node N3 in a reverse direction. For example, an anode of the second diode Dn may be connected to the third node N3 and a cathode of the second diode Dn may be connected to the first node N1. The second capacitor Cn may include a first electrode connected to the third node N3 and a second electrode connected to the reference node RN.

The output switching element OSW may switch the connection of the analog-to-digital converter ADC and the rectifier circuit RTC. The analog-to-digital converter ADC may be connected to the second node N2 and the third node N3 through the output switching element OSW. The first rectifier circuit RTC1 may be connected to the analog-to-digital converter ADC through the second node N2. The second rectifier circuit RTC2 may be connected to the analog-to-digital converter ADC through the third node N3.

The output switching element OSW may include a first output switching element OSW1 and a second output switching element OSW2. The first and second output switching elements OSW1 and OSW2 may selectively connect the analog-to-digital converter ADC to the first rectifier circuit RTC1 and the second rectifier circuit RTC2.

The first output switching element OSW1 may be connected to a first input terminal IN1 of the analog-to-digital converter ADC. The second output switching element OSW2 may be connected to a second input terminal IN2 of the analog-to-digital converter ADC.

The first rectifier circuit RTC1 may be connected to the analog-to-digital converter ADC by the first and second output switching elements OSW1 and OSW2. For example, to connect the first rectifier circuit RTC1 and the analog-to-digital converter ADC, the first output switching element OSW1 may connect the second node N2 to the analog-to-digital converter ADC of the analog-to-digital converter ADC, and the second output switching element OSW2 may connect the reference node RN to the analog-to-digital converter ADC. The first output switching element OSW1 may connect the second node N2 to the first input terminal IN1 of the analog-to-digital converter ADC and the second output switching element OSW2 may connect the reference node RN to the second input terminal IN2 of the analog-to-digital converter ADC.

The second rectifier circuit RTC2 may be connected to the analog-to-digital converter ADC by the first and second output switching elements OSW1 and OSW2. For example, to connect the second rectifier circuit RTC2 and the analog-to-digital converter ADC, the second output switching element OSW2 may connect the third node N3 to the analog-to-digital converter ADC and the first output switching element OSW1 may connect the reference node RN to the analog-to-digital converter ADC. The first output switching element OSW1 may connect the reference node RN to the first input terminal IN1 of the analog-to-digital converter ADC and the second output switching element OSW2 may connect the third node N3 to the second input terminal IN2 of the analog-to-digital converter ADC.

The first and second output switching elements OSW1 and OSW2 may be controlled by the first and second switching control circuits SWC1 and SWC2. The first output switching element OSW1 and the second output switching element OSW2 may be respectively connected to the second node N2 and the reference node RN by a first output switching signal OS1 from the first switching control part SWC1. The first output switching element OSW1 and the second output switching element OSW2 may be respectively connected to the reference node RN and the third node N3 by a second output switching signal OS2 from the second switching control part SWC2.

Referring to FIG. 9, the first output switching element OSW1 may include a first switching element S1 that is turned on or turned off by the first output switching signal OS1 and a second switching element S2 that is turned on or turned off by the second output switching signal OS2. The first switching element S1 may control the connection of the second node N2 and the first input terminal IN1 of the analog-to-digital converter ADC. The second switching element S2 may control the connection of the reference node RN and the first input terminal IN1 of the analog-to-digital converter ADC.

The second output switching element OSW2 may include a third switching element S3 that is turned on or turned off by the first output switching signal OS1 and a fourth switching element S4 that is turned on or turned off by the second output switching signal OS2. The third switching element S3 may control the connection of the reference node RN and the second input terminal IN2 of the analog-to-digital converter ADC. The fourth switching element S4 may control the connection of the third node N3 and the second input terminal IN2 of the analog-to-digital converter ADC.

The first, second, third, and fourth switching elements S1, S2, S3, and S4 may be NMOS transistors. The first and third switching elements S1 and S3 may be simultaneously controlled by the first output switching signal OS1. The second and fourth switching elements S2 and S4 may be simultaneously controlled by the second output switching signal OS2.

The first reset switching element RSW1 may be connected between the first rectifier circuit RTC1 and the reference node RN and may reset the second node N2 of the first rectifier circuit RTC1 to the reference voltage Vref. The second reset switching element RSW2 may be connected between the second rectifier circuit RTC2 and the reference node RN and may reset the third node N3 of the second rectifier circuit RTC2 to the reference voltage Vref.

The first reset switching element RSW1 which is connected between the second node N2 and the reference node RN may be turned on or turned off by a first reset signal RS1 output from the first switching control part SWC1. The second reset switching element RSW2 which is connected between the third node N3 and the reference node RN may be turned on or turned off by a second reset signal RS2 output from the second switching control part SWC2.

The first reset switching element RSW1 may be turned on by the first reset signal RS1 and may reset the second node N2 of the first rectifier circuit RTC1 to the reference voltage Vref. The second reset switching element RSW2 may be turned on by the second reset signal RS2 and may reset the third node N3 of the second rectifier circuit RTC2 to the reference voltage Vref.

The summing circuit SMC may sum "N" digital signals output from the analog-to-digital converter ADC. For example, "N" digital signals may be continuous output from the demodulating circuit DMC by continuously processing the sensing signals RS. The summing circuit SMC may sum and output the "N" digital signals that are continuously output. The summing circuit SMC may add a current digital signal to a previous digital signal.

Figure 10:
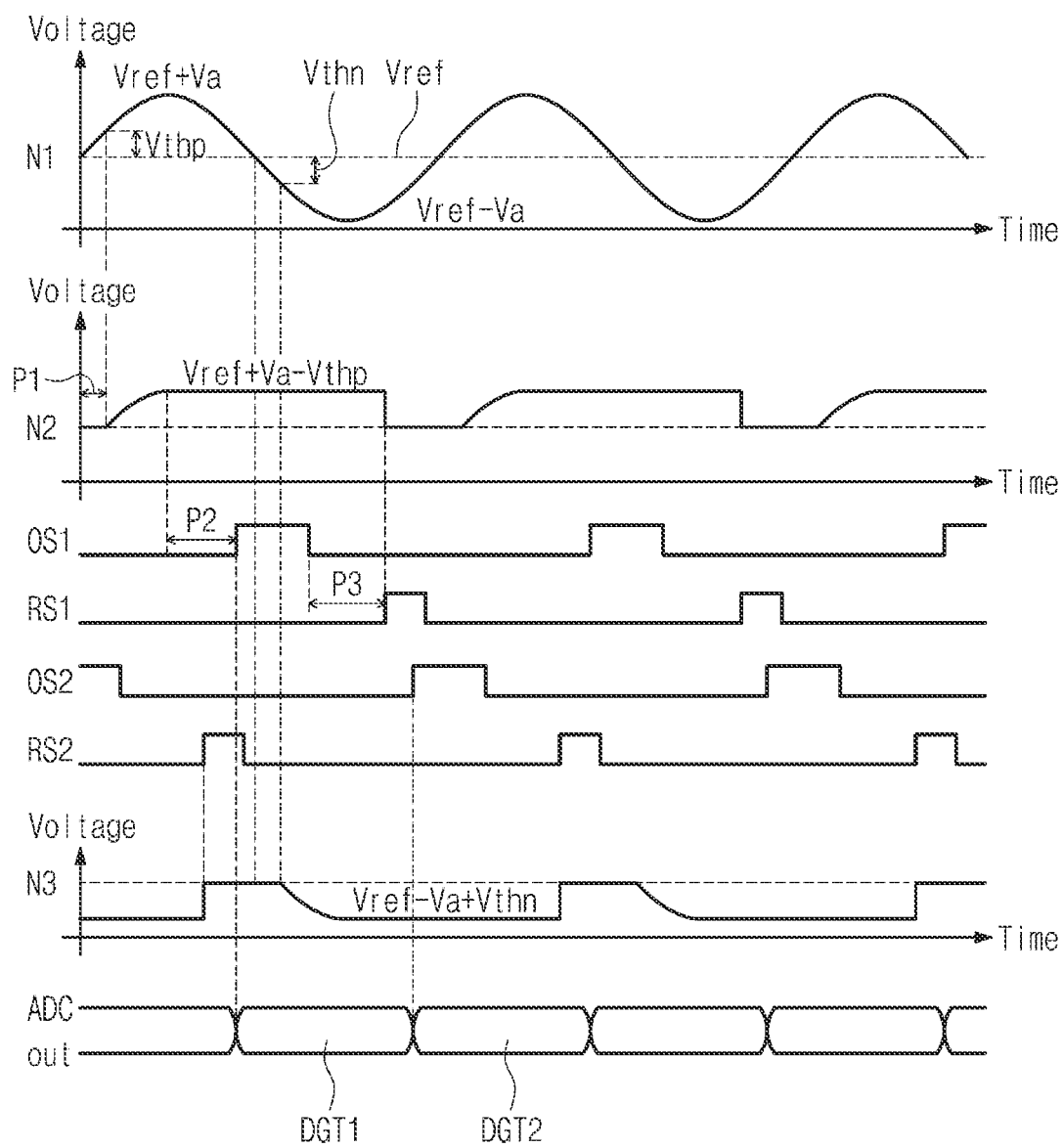
FIG. 10 is a timing diagram for describing an operation of a receive circuit illustrated in FIG. 7.

FIG. 10 is a timing diagram for describing an operation of a receive circuit illustrated in FIG. 7. FIGS. 11A to 11D are diagrams illustrating operating states of a receive circuit according to the timing diagram of FIG. 10.

Figure 11A:
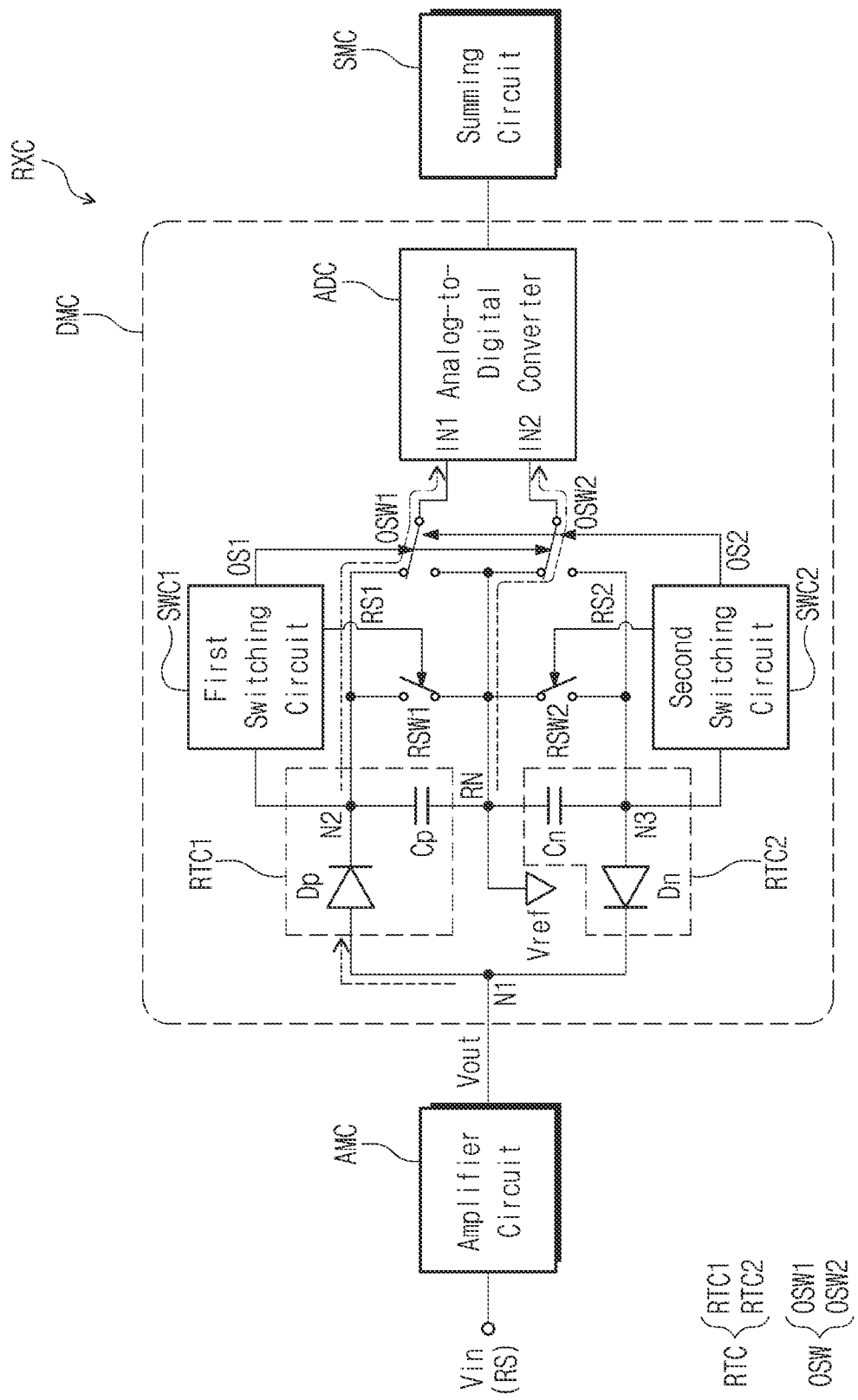
FIGS. 11A, 11B, 11C and 11D are diagrams illustrating operating states of a receive circuit according to the timing diagram of FIG. 10.

Referring to FIGS. 10 and 11A, a voltage of the first node N1 may have a sine wave. A positive-polarity voltage +Va and a negative-polarity voltage −Va that is determined with respect to the reference voltage Vref may be applied to the first node N1. The voltage of the first node N1 may be defined as a voltage corresponding to the output signal Vout of the amplifier circuit AMC described above.

The positive-polarity voltage +Va may be applied to the second node N2 through the first diode Dp disposed in the forward direction. The first diode Dp may have a first threshold voltage Vthp. When a voltage difference of opposite ends of the first diode Dp (e.g., a voltage difference of the first node N1 and the second node N2) is greater than the first threshold voltage Vthp, a current may flow through the first diode Dp.

Even though the positive-polarity voltage +Va at the first node N1 increases, a current may not flow through the first diode Dp until the voltage difference of the opposite ends of the first diode Dp is greater than the first threshold voltage Vthp. Accordingly, a voltage of the second node N2 may not be changed during a first period P1 that is a time required for the voltage difference of the opposite ends of the first diode Dp to reach the first threshold voltage Vthp.

When the voltage difference of the opposite ends of the first diode Dp is greater than the first threshold voltage Vthp, a current may flow through the first diode Dp, and thus, a voltage of the second node N2 may increase. In this case, the voltage of the second node N2 may increase in proportional to an increase in the voltage of the first node N1. The voltage of the second node N2 may increase until the voltage of the first node N1 reaches a maximum value; afterwards, the voltage of the second node N2 may be maintained at a DC voltage.

A maximum voltage value of the second node N2 may be defined as a peak voltage, and the peak voltage of the second node N2 may be "Vref+Va−Vthp" which is a voltage subtracted the first threshold voltage Vthp of the first diode DP from the sum of the reference Vref and the positive-polarity voltage +Va. The voltage of the second node N2 may be charged in the first capacitor Cp.

Below, high levels of the first and second output switching signals OS1 and and the first and second reset signals RS1 and RS2 may be defined as activated signals; low levels of the first and second output switching signals OS1 and OS2 and the first and second reset signals RS1 and RS2 may be defined as deactivated signals. The first output switching signal OS1 that is activated may be applied to the first and second output switching elements OSW1 and OSW2 after a predetermined time (e.g., a second period P2) has passed from a point in time when the voltage of the second node N2 reaches the peak voltage "Vref+Va−Vthp". The first and third switching elements S1 and S3 illustrated in FIG. 9 may be turned on by the first output switching signal OS1.

The first output switching element OSW1 and the second output switching element OSW2 may be respectively connected to the second node N2 and the reference node RN. As a result, the first rectifier circuit RTC1 may be connected to the analog-to-digital converter ADC. The second node N2 may be connected to the first input terminal IN1 of the analog-to-digital converter ADC and the reference node RN may be connected to the second input terminal IN2 of the analog-to-digital converter ADC.

As a sensing voltage, a first charging voltage charged in the first capacitor Cp may be provided to the analog-to-digital converter ADC. The analog-to-digital converter ADC may convert the sensing voltage output from the first rectifier circuit RTC1 into a first digital signal DGT1 and may output the first digital signal DGT1 to the summing circuit SMC.

The peak voltage "Vref+Va−Vthp" may be applied to the first input terminal IN1 of the analog-to-digital converter ADC and the reference voltage Vref may be applied to the second input terminal IN2 of the analog-to-digital converter ADC. The analog-to-digital converter ADC may convert a potential difference of the first input terminal IN1 and the second input terminal IN2 into a digital signal. Accordingly, a sensing voltage value processed by the analog-to-digital converter ADC may be set to a value of "Va−Vthp" being a potential difference of the peak voltage "Vref+Va−Vthp" and the reference voltage Vref. The analog-to-digital converter ADC may convert the value of "Va−Vthp" into a digital signal and may output the first digital signal DGT1 as a conversion result.

According to the above description, the positive-polarity voltage +Va of the output signal Vout of the amplifier circuit AMC may be provided to the first rectifier circuit RTC1, and the output of the first rectifier circuit RTC1 may be provided to the analog-to-digital converter ADC and may be converted into the first digital signal DGT1.

Figure 11B:
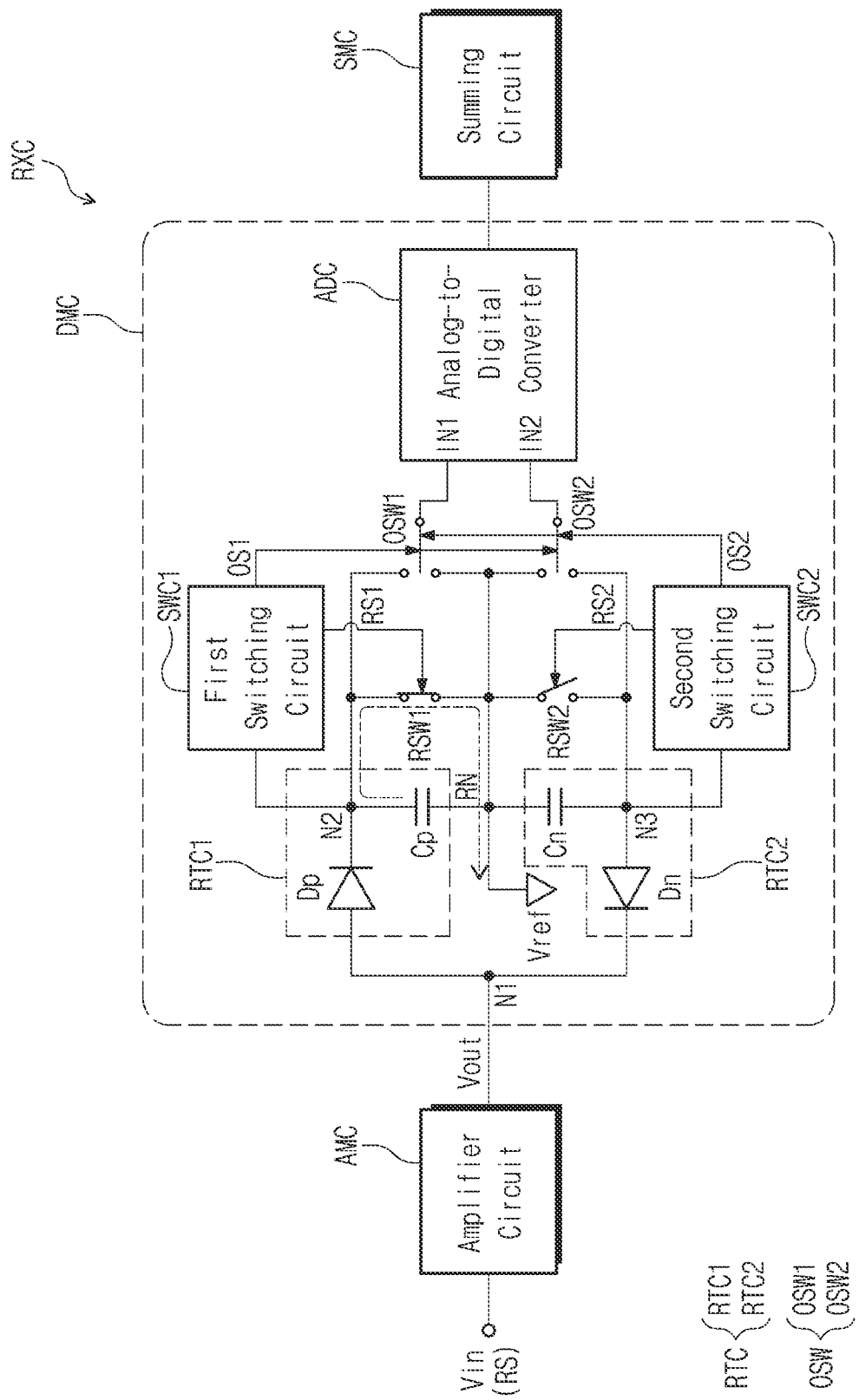

Referring to FIGS. 10 and 11B, the first reset signal RS1 that is activated may be applied to the first reset switching element RSW1 after a predetermined time (e.g., a third period P3) has passed from a point in time when the first output switching signal OS1 is deactivated. The first reset switching element RSW1 may be turned on, and the voltage charged in the first capacitor Cp may be discharged to the reference voltage Vref. The operation in which the voltage of the first capacitor Cp is discharged to the reference voltage Vref may be defined as a reset operation.

An operation of the receive circuit RXC associated with the negative-polarity voltage −Va, which will be described below, may be the same as the operation of the receive circuit RXC associated with the positive-polarity voltage +Va except that a phase of the third node N3 differs. That is, a signal processing operation associated with the negative-polarity voltage −Va may be performed based on the following timing and may be substantially the same as the signal processing operation associated with the positive-polarity voltage +Va.

Figure 11C:
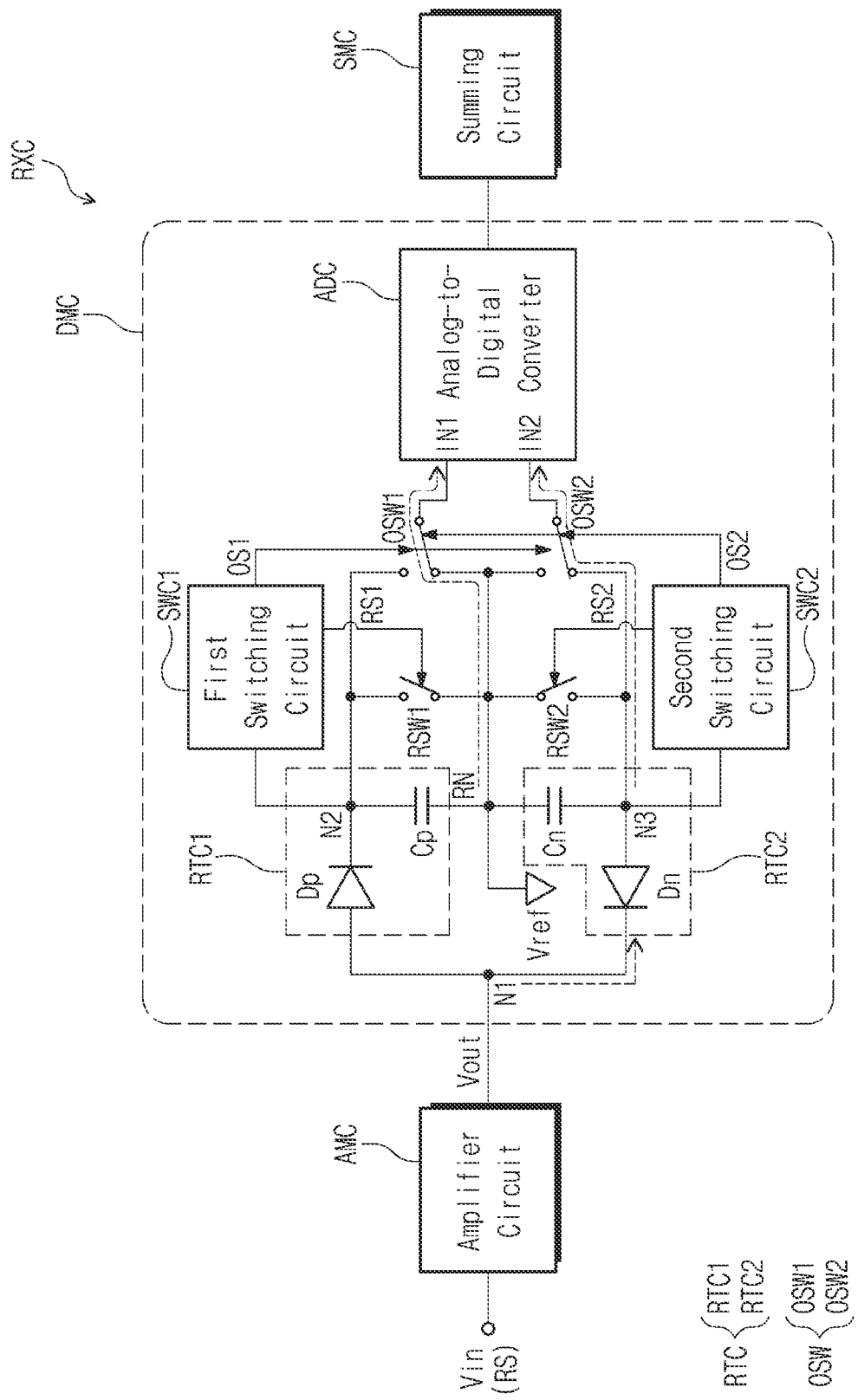

Referring to FIGS. 10 and 11C, the negative-polarity voltage −Va may be applied to the first node N1. The negative-polarity voltage −Va may be applied to the third node N3 through the second diode Dn disposed in the reverse direction. The second diode Dn may have a second threshold voltage Vthn.

Even though the negative-polarity voltage −Va at the first node N1 decreases, a current may not flow through the second diode Dn until a voltage difference of opposite ends of the second diode Dn is greater than the second threshold voltage Vthn. Accordingly, a voltage of the third node N3 may not be changed during a given time.

When the voltage difference of the opposite ends of the second diode Dn is greater than the second threshold voltage Vthn, a current may flow through the second diode Dn, and thus, the voltage of the third node N3 may decrease. In this case, the voltage of the third node N3 may decrease to a minimum voltage value along a decrease in the voltage of the first node N1.

A minimum voltage value of the third node N3 may be defined as a peak voltage, and the peak voltage of the third node N3 may be "Vref−Va+Vthn" which is a voltage added the second threshold voltage Vthn of the second diode Dn to the sum of the reference Vref and the negative-polarity voltage −Va. The voltage of the third node N3 may be charged in the second capacitor Cn.

The second output switching signal OS2 that is activated after a predetermined time has passed from a point in time when the voltage of the third node N3 reaches the peak voltage "Vref−Va+Vthn" may be applied to the first and second output switching elements OSW1 and OSW2. The second and fourth switching elements S2 and S4 illustrated in FIG. 9 may be turned on by the second output switching signal OS2.

The first output switching element OSW1 and the second output switching element OSW2 may be respectively connected to the reference node RN and the third node N3. As a result, the second rectifier circuit RTC2 may be connected to the analog-to-digital converter ADC. The reference node RN may be connected to the first input terminal IN1 of the analog-to-digital converter ADC and the third node N3 may be connected to the second input terminal IN2 of the analog-to-digital converter ADC.

As a sensing voltage, a second charging voltage charged in the second capacitor Cn may be provided to the analog-to-digital converter ADC. The analog-to-digital converter ADC may convert the sensing voltage output from the second rectifier circuit RTC2 into a second digital signal DGT2 and may output the second digital signal DGT2 to the summing circuit SMC.

The reference voltage Vref may be applied to the first input terminal IN1 and the peak voltage "Vref−Va+Vthn" may be applied to the second input terminal IN2. A sensing voltage value processed by the analog-to-digital converter ADC may be set to a value of "−Va+Vthn" being a potential difference of the reference voltage Vref and the peak voltage "Vref−Va+Vthn". The analog-to-digital converter ADC may convert the value of "−Va+Vthn" into a digital signal and may output the second digital signal DGT2 as a conversion result.

According to the above description, the negative-polarity voltage −Va of the output signal Vout of the amplifier circuit AMC may be provided to the second rectifier circuit RTC2, and the output of the second rectifier circuit RTC2 may be provided to the analog-to-digital converter ADC and may be converted into the second digital signal DGT2.

The first and second digital signals DGT1 and DGT2 output from the analog-to-digital converter ADC may be defined as sensing values.

Figure 11D:
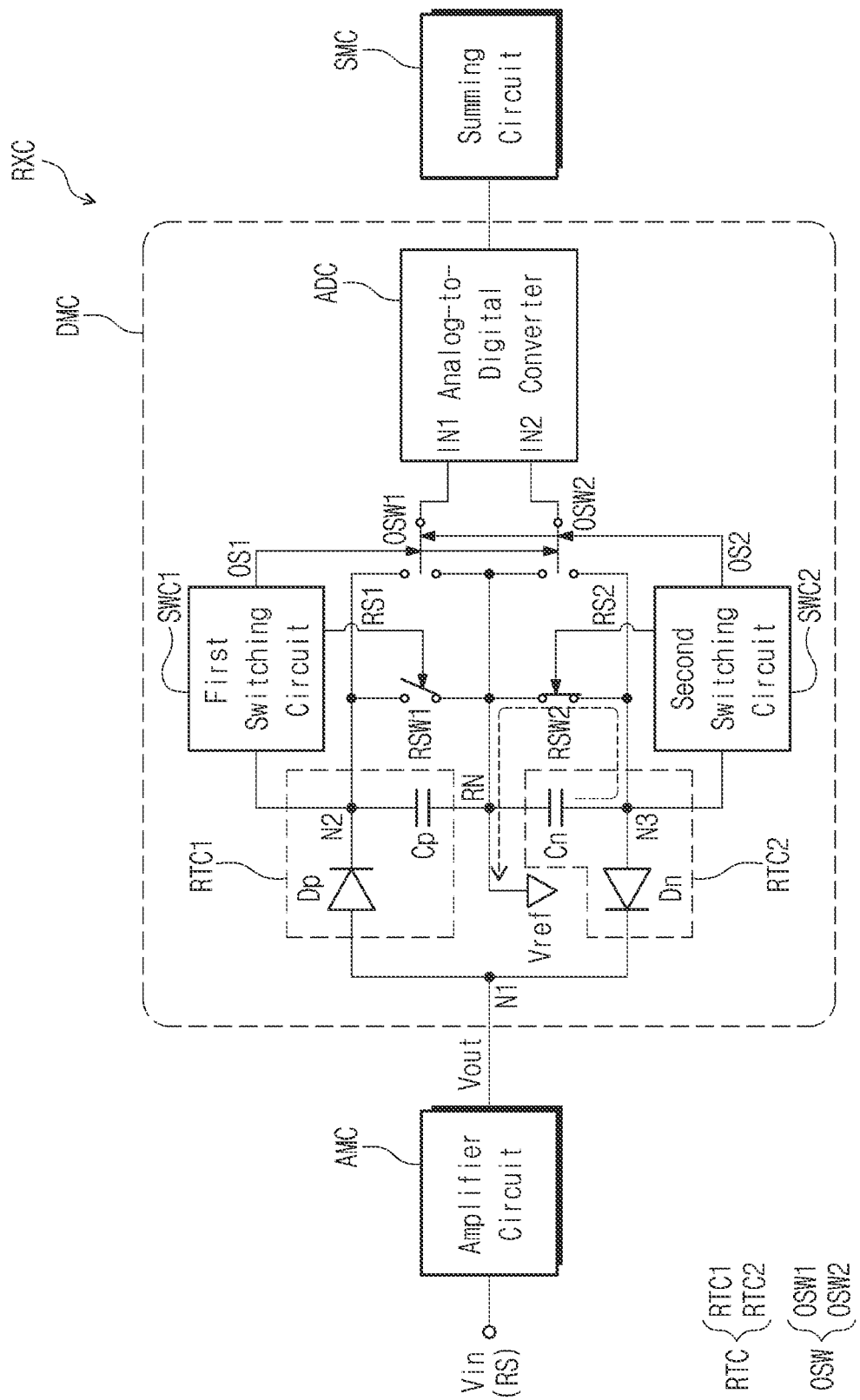

Referring to FIGS. 10 and 11D, the second reset signal RS2 that is activated may be applied to the second reset switching element RSW2 after a predetermined time has passed from a point in time when the second output switching signal OS2 is deactivated. The second reset switching element RSW2 may be turned on and the voltage charged in the second capacitor Cn may be discharged to the reference voltage Vref. The operation in which the voltage of the second capacitor Cn is discharged to the reference voltage Vref may be defined as a reset operation.

The first and second digital signals DGT1 and DGT2 may be provided to the summing circuit SMC. The first and second digital signals DGT1 and DGT2 may be substantially defined as sensing values sensed by the first and second sensing parts SP1 and SP2.

When only one sensing value is used as a sensing data, a noise may be included in the only sensing value. When one sensing value including a noise is "11" and a normal sensing value is "10", an error of 10% may occur. When one sensing value including a nose and 9 normal sensing values may be added and output by the summing circuit SMC, because a value obtained by adding 10 sensing values is "101" and a value obtained by adding 10 normal sensing values is "100", an error of 1% may occur. Accordingly, in the case of adding and using a plurality of sensing values, a signal-to-noise ratio (SNR) may be improved.

In an embodiment of the present disclosure, the summing circuit SMC may add "N" sensing values output from the analog-to-digital converter ADC. Herein, N may be a natural number of 2 or more. A value that is obtained by adding "N" sensing values may be output from the summing circuit SMC and may be used to calculate touch coordinates at an external control module (not illustrated).

The demodulating circuit DMC of the receive circuit RXC according to an embodiment of the present disclosure may be implemented with two diodes Dp and Dn, two capacitors Cp and Cn, two reset switching elements RSW1 and RSW2, and two output switching elements OSW1 and OSW2, and thus, the demodulating circuit DMC may be implemented with a simpler circuit configuration. Also, because the demodulating circuit DMC processes and outputs a signal by using only the input signal Vin without using a carrier wave, a demodulation signal may be normally output regardless of a phase difference of the carrier wave and the input signal Vin.

The signal processing operations of the demodulating circuit DMC described with reference to FIGS. 11A to 11D may be defined as a sensing operation.

Figure 12:
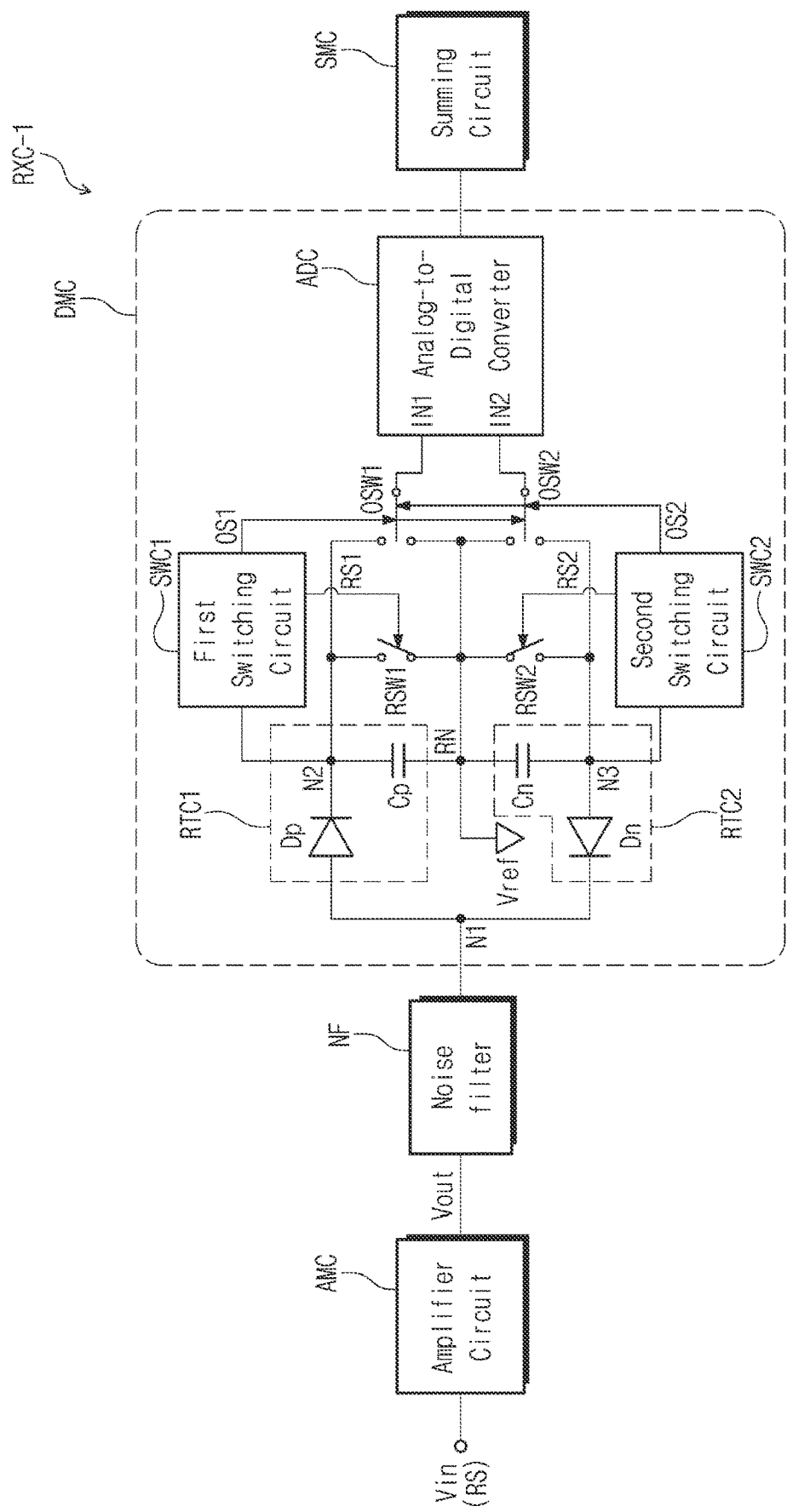
FIG. 12 is a diagram illustrating a configuration of a receive circuit according to an embodiment of the present disclosure.

FIG. 12 is a diagram illustrating a configuration of a receive circuit according to an embodiment of the present disclosure.

Below, a configuration of a receive circuit RXC-1 illustrated in FIG. 12 will be mainly described based on a difference with the receive circuit RXC illustrated in FIG. 7.

Referring to FIG. 12, the receive circuit RXC-1 may further include a noise filter NF interposed between the amplifier circuit AMC and the demodulating circuit DMC. The noise filter NF may be connected to the output terminal of the amplifier circuit AMC and the first node N1.

The noise filter NF may remove a noise of the output signal Vout and may provide the noise-free output signal Vout to the demodulating circuit DMC. Various filters may be used as the noise filter NF. For example, the noise filter NF may include a low pass filter LPF, a high pass filter HPF, or a band pass filter BPF.

Figure 13:
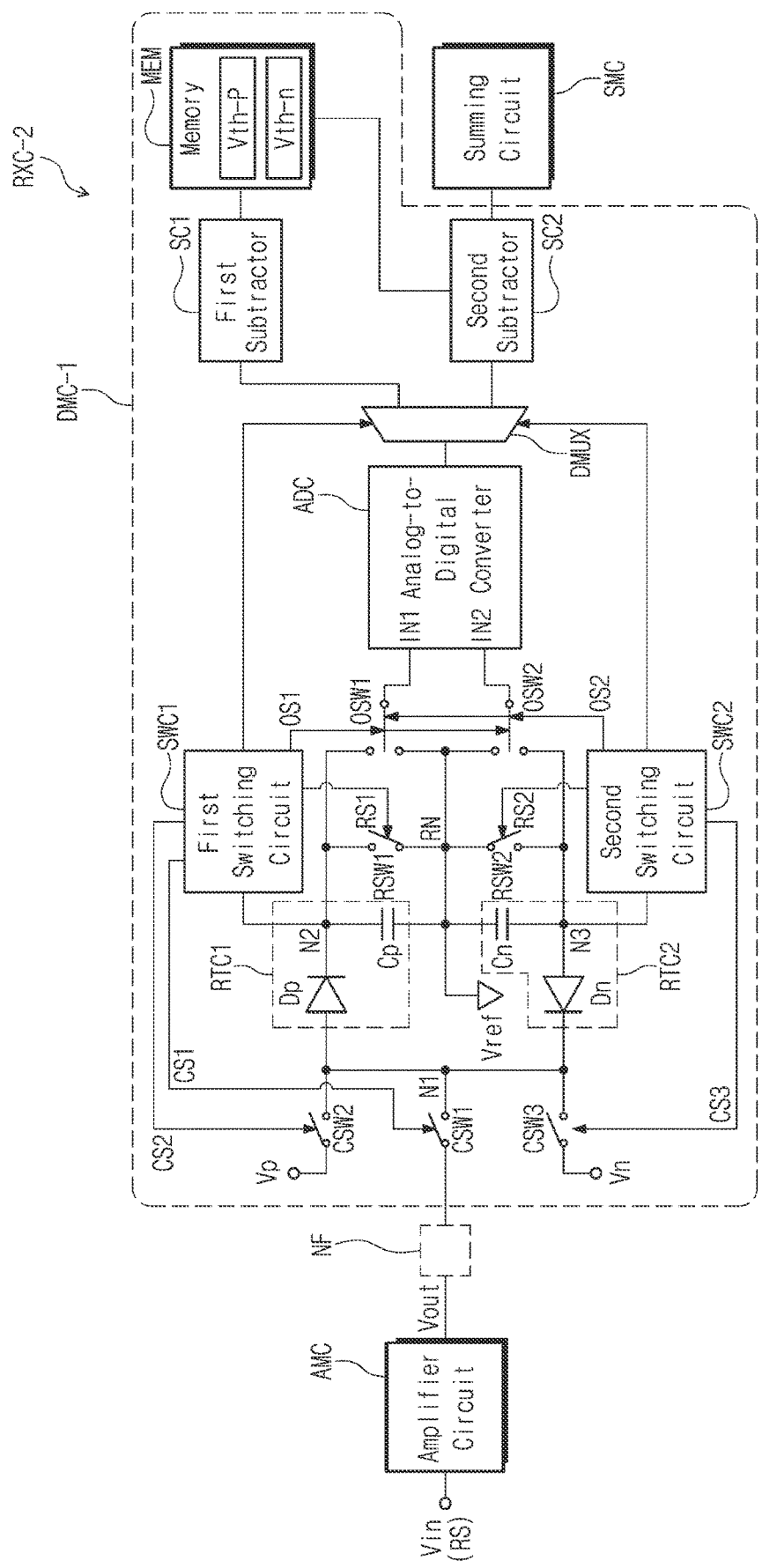
FIG. 13 is a diagram illustrating a configuration of a receive circuit according to an embodiment of the present disclosure.

FIG. 13 is a diagram illustrating a configuration of a receive circuit according to another embodiment of the present disclosure.

Below, a configuration of a receive circuit RXC-2 illustrated in FIG. 13 will be mainly described based on a difference with the receive circuit RXC illustrated in FIG. 7.

Referring to FIG. 13, a demodulating circuit DMC-1 of a receive circuit RXC-2 may further include first, second, and third connection switching elements CSW1, CSW2, and CSW3, a demultiplexer circuit DMUX, first and second subtractors SC1 and SC2, and a memory MEM.

The first connection switching element CSW1 may be connected between the output terminal of the amplifier circuit AMC and the first node N1. The first connection switching element CSW1 may be turned on or turned off by a first connection switching signal CS1 output from the first switching control part SWC1. The second connection switching element CSW2 may be supplied with a first voltage Vp and may be connected between the first node N1 and the first voltage supply line. The first voltage Vp may be higher in level than the reference voltage Vref. That is, the first voltage Vp may have a positive polarity compared to the reference voltage Vref. The second connection switching element CSW2 may be turned on or turned off by a second connection switching signal CS2 output from the first switching control part SWC1.

The third connection switching element CSW3 may be supplied with a second voltage Vn and may be connected between the first node N1 and a second voltage. The second voltage Vn may be lower in level than the reference voltage Vref. That is, the second voltage Vn may have a negative polarity compared to the reference voltage Vref. The third connection switching element CSW3 may be turned on or turned off by a third connection switching signal CS3 output from the second switching control part SWC2.

The first rectifier circuit RTC1 and the second rectifier circuit RTC2 may be connected to the first, second, and third connection switching elements CSW1, CSW2, and CSW3 through the first node N1. The first connection switching element CSW1 may control the connection of the amplifier circuit AMC and the rectifier circuit RTC.

The second connection switching element CSW2 may control the first voltage Vp to be applied to the rectifier circuit RTC. The first voltage Vp may be applied to the first rectifier circuit RTC1 by the second connection switching element CSW2.

The third connection switching element CSW3 may control the second voltage Vn to be applied to the rectifier circuit RTC2. The second voltage Vn may be applied to the second rectifier circuit RTC2 by the third connection switching element CSW3.

The first subtractor SC1 may subtract a first voltage value (e.g., a digital value of the first voltage Vp) (hereinafter marked by the same sign) and a second voltage value (e.g., a digital value of the second voltage Vn) (hereinafter marked by the same sign) from a digital signal output from the analog-to-digital converter ADC and output subtracted voltages to the memory. A value that is output from the first subtractor SC1 may be a first threshold value corresponding to the first threshold voltage Vthp of the first diode Dp and a second threshold value corresponding to the second threshold voltage Vthn of the second diode Dn. The above operation will be described in detail later.

The first threshold value and the second threshold value may be stored in the memory MEM. The first threshold value may be stored in a first storage space Vth-p of the memory MEM and the second threshold value may be stored in a second storage space Vth-n of the memory MEM.

The second subtractor SC2 may be provided with the first and second threshold values from the memory MEM. The second subtractor SC2 may subtract the first threshold value and the second threshold value from a digital signal output from the analog-to-digital converter ADC and output the subtracted voltage to the summing circuit SMX. The above operation will be described in detail later.

The demultiplexer circuit DMUX may selectively connect the analog-to-digital converter ADC to the first subtractor SC1 and the second subtractor SC2 under control of the first and second switching control parts SWC1 and SWC2.

The receive circuit RXC-2 may further include the noise filter NF. In the embodiment illustrated in FIG. 13, the noise filter NF illustrated in FIG. 12 may be interposed between the amplifier circuit AMC and the first connection switching element CSW1. In an embodiment, in FIG. 13, the noise filter NF is depicted by a dotted line.

Figure 14:
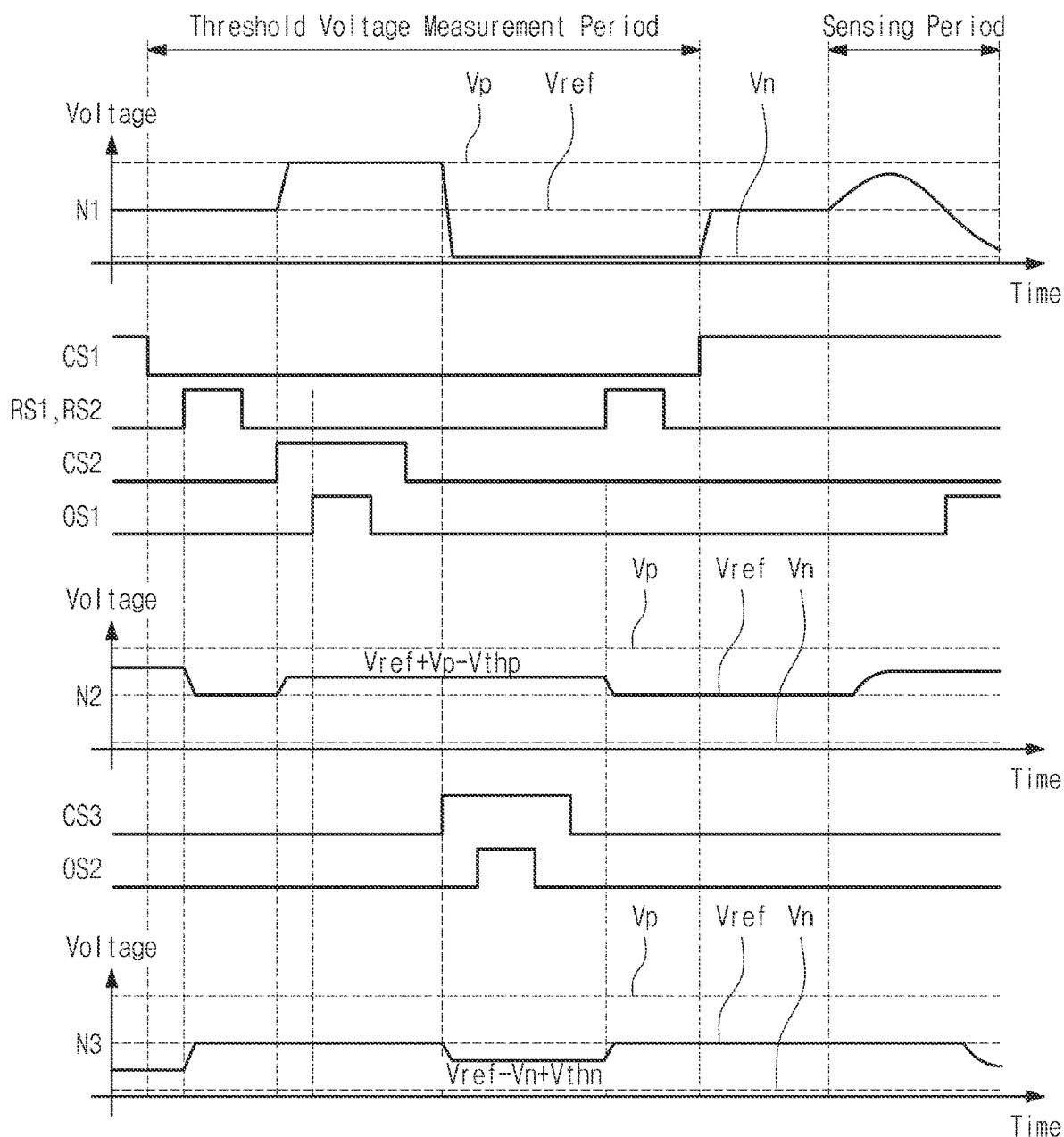
FIG. 14 is a timing diagram for describing an operation of a receive circuit illustrated in FIG. 13.

FIG. 14 is a timing diagram for describing an operation of a receive circuit illustrated in FIG. 13. FIGS. 15A to 15D are diagrams illustrating operating states of a receive circuit according to the timing diagram of FIG. 10.

Below, in signals associated with a switching operation, a high level may be defined as an activated signal, and a low level may be defined as a deactivated signal. In an embodiment, in FIGS. 15A to 15D, the noise filter NF is omitted.

Figure 15A:
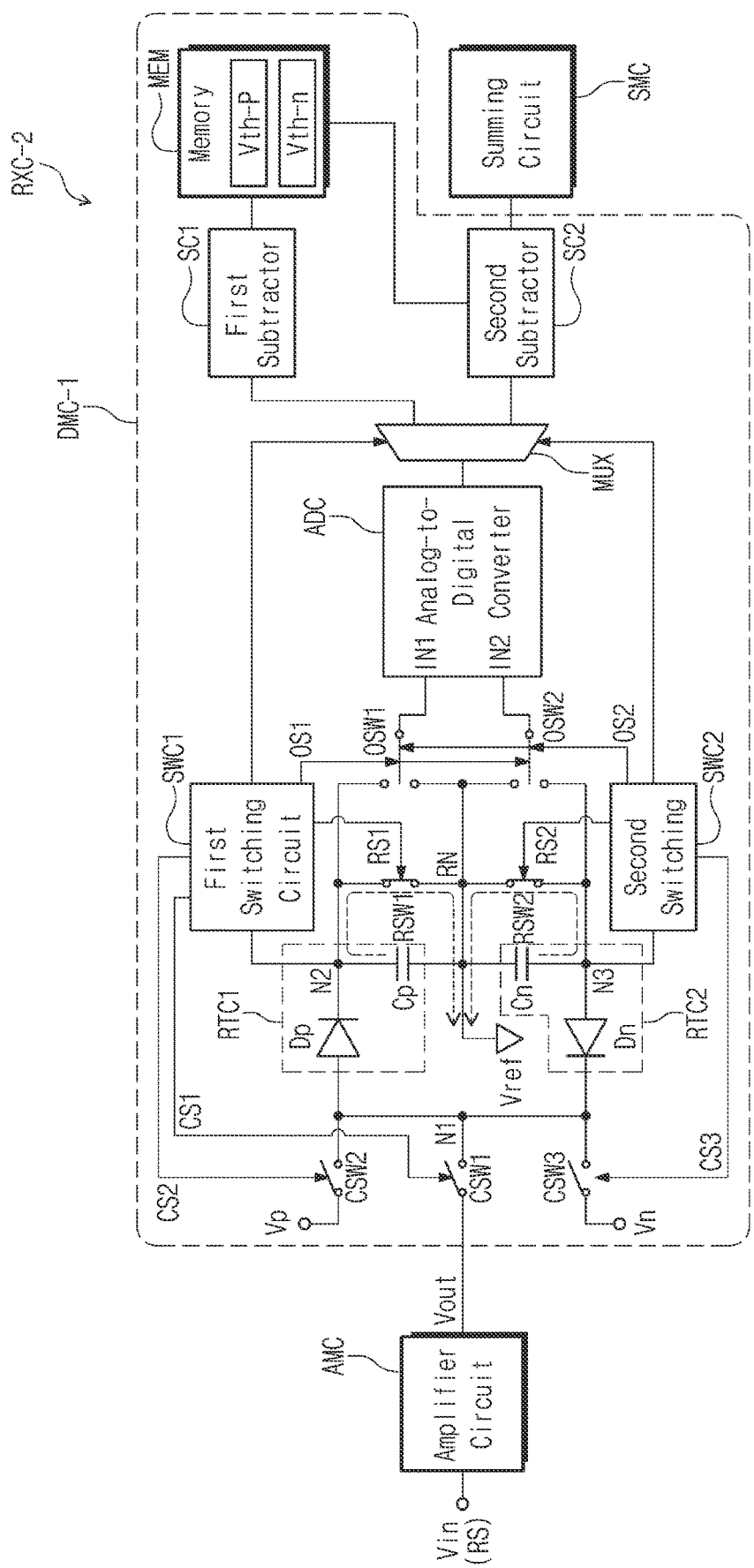
FIGS. 15A, 15B, 15C and 15D are diagrams illustrating operating states of a receive circuit according to the timing diagram of FIG. 10.

Referring to FIGS. 14 and 15A, after a threshold voltage measurement operation is performed in a threshold voltage measurement period, a sensing operation may be performed in a sensing period. The sensing period that is a period in which an operation according to the timing illustrated in FIG. 10 is performed may be defined as a signal processing operation of a demodulating circuit.

In the threshold voltage measurement period, the first connection switching signal CS1 may be deactivated, and the first connection switching element CSW1 may be turned off. Accordingly, the amplifier circuit AMC may be disconnected from the demodulating circuit DMC-1.

Next, the first and second reset switching elements RSW1 and RSW2 may be turned on by the first and second reset signals RS1 and RS2 activated, and the first and second capacitors Cp and Cn may be discharged to the reference voltage Vref. Accordingly, the second node N2 and the third node N3 may be reset to the reference voltage Vref.

The first and second rectifier circuits RTC1 and RTC2 may be simultaneously reset by the first and second reset switching elements RSW1 and RSW2. Afterwards, the first voltage Vp and the second voltage Vn may be applied to the first rectifier circuit RTC1 and the second rectifier circuit RTC2. This will be described with reference to FIGS. 15B and 15C.

Figure 15B:
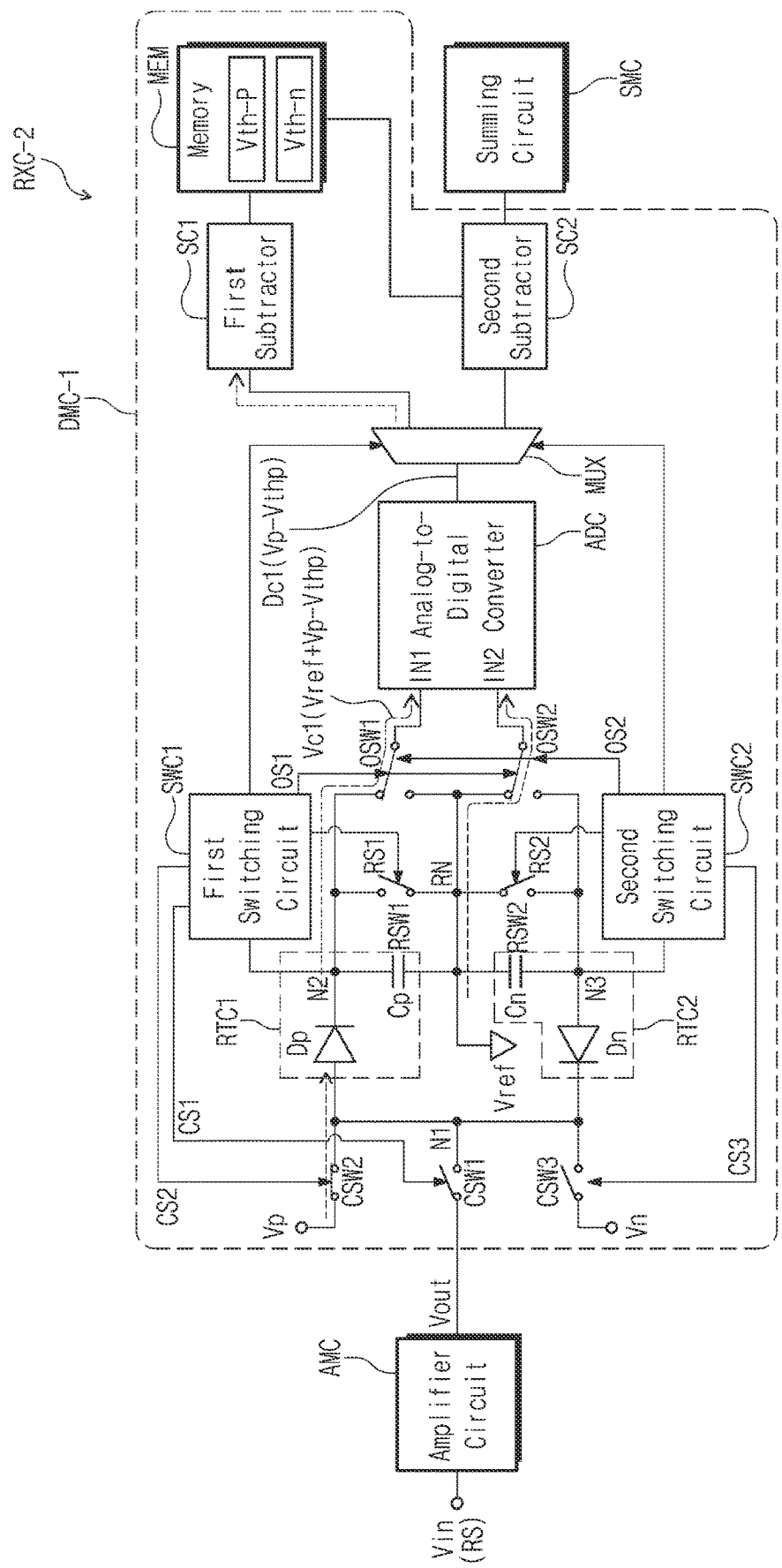

Referring to FIGS. 14 and 15B, the second connection switching element CSW2 may be turned on by the second connection switching signal CS2 activated in the threshold voltage measurement period. The first rectifier circuit RTC1 may be connected to the analog-to-digital converter ADC via the first switching element OSW1 in response to the first output switching signal OS1.

The first voltage Vp may be provided to the first rectifier circuit RTC1 by the second connection switching element CSW2. Because the first diode Dp has the first threshold voltage Vthp, a voltage of the second node N2 may have a value of "Vref+Vp−Vthp". The voltage of the second node N2 may be stored in the first capacitor Cp.

The voltage value "Vref+Vp−Vthp" charged in the first capacitor Cp may be provided to the analog-to-digital converter ADC as a first compensation voltage Vc1. The analog-to-digital converter ADC may convert a potential difference of the first input terminal IN1 and the second input terminal IN2 of the analog-to-digital converter ADC into a digital signal and may output the digital signal as a first compensation digital signal Dc1.

The first compensation voltage Vc1 may be applied to the first input terminal IN1, and the reference voltage Vref may be applied to the second input terminal IN2. Accordingly, a voltage value processed by the analog-to-digital converter ADC may be set to "Vp−Vthp". As a result, the first compensation digital signal Dc1 may have a value of "Vp−Vthp".

In the threshold voltage measurement period, the demultiplexer circuit DMUX may connect the analog-to-digital converter ADC to the first subtractor SC1 under control of the first switching control part SWC1.

The first compensation digital signal Dc1 may be provided to the first subtractor SC1 through the demultiplexer circuit DMUX. The first subtractor SC1 may subtract the first voltage value Vp from the first compensation digital signal Dc1.

A value output from the first subtractor SC1 may be −Vthp obtained by subtracting the first voltage value Vp from "Vp−Vthp" and may be defined as a first threshold value −Vthp. The first threshold value −Vthp may be defined as a value corresponding to the first threshold voltage Vthp. The first threshold value −Vthp may be stored in the first storage space Vth-p of the memory MEM.

The first threshold value−Vthp corresponding to the first threshold voltage Vthp may be stored in the memory MEM by using the first voltage Vp. An operation of storing a second threshold value−Vthn corresponding to the second threshold voltage Vthn by using the second voltage Vn may also be performed at the following timing and may be substantially the same as the operation described with reference to FIG. 15B.

Figure 15C:
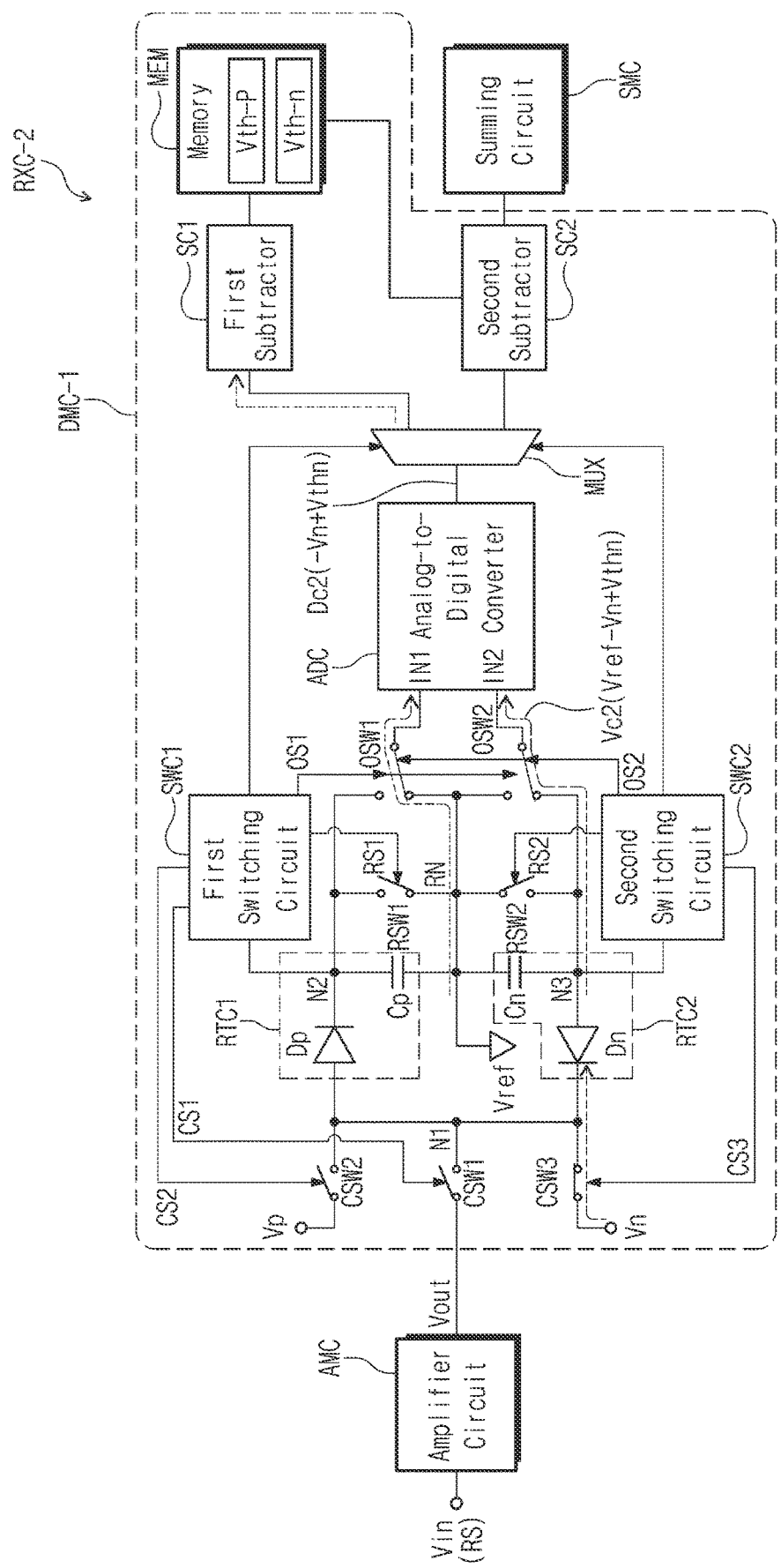

Referring to FIGS. 14 and 15C, in the threshold voltage measurement period, the third connection switching element CSW3 may be turned on by the third connection switching signal CS3 activated. The second rectifier circuit RTC2 is connected to the analog-to-digital converter ADC via first and second output switching elements OSW1 and OSW2 which are turned on in response to the second output switching signal OS2 activated.

The second voltage Vn may be provided to the second rectifier circuit RTC2 via the third connection switching element CSW3. Because the second diode Dn has the second threshold voltage Vthn, a voltage of the third node N3 may have a value of "Vref−Vn+Vthn". The voltage of the third node N3 may be stored in the second capacitor Cn.

The voltage value "Vref−Vn+Vthn" charged in the second capacitor Cn may be provided to the analog-to-digital converter ADC as a second compensation voltage Vc2. The analog-to-digital converter ADC may convert a potential difference of the first input terminal IN1 and the second input terminal IN2 of the analog-to digital converter ADC into a digital signal and may output the digital signal as a second compensation digital signal Dc2.

The reference voltage Vref may be applied to the first input terminal IN1, and the second compensation voltage Vc2 may be applied to the second input terminal IN2. Accordingly, a voltage value processed by the analog-to-digital converter ADC may be set to "−Vn+Vthn". As a result, the second compensation digital signal Dc2 may have a value of "−Vn+Vthn".

The second compensation digital signal Dc2 may be provided to the first subtractor SC1 through the demultiplexer circuit DMUX. The first subtractor SC1 may subtract a second voltage value Vn from the second compensation digital signal Dc2.

A value output from the first subtractor SC1 may be +Vthn obtained by removing the second voltage value Vn from "−Vn+Vthn" and may be defined as a second threshold voltage +Vthn. The second threshold value+Vthn may be defined as a value corresponding to the second threshold voltage Vthn. The second threshold value+Vthn may be stored in the second storage space Vth-n of the memory MEM.

Afterwards, the first and second reset switching elements RSW1 and RSW2 may be turned on by the first and second reset signals RS1 and RS2 activated, and the first and second capacitors Cp and Cn may be discharged to the reference voltage Vref. Accordingly, the second node N2 and the third node N3 may be reset to the reference voltage Vref.

After the threshold voltage measurement period, in the sensing period, the demodulating circuit DMC-1 may perform the operations described with reference to FIG. 10 and FIG. 11D. Below, in an embodiment, an operation of the demodulating circuit DMC-1 associated with the positive-polarity voltage +Va will be described.

Figure 15D:
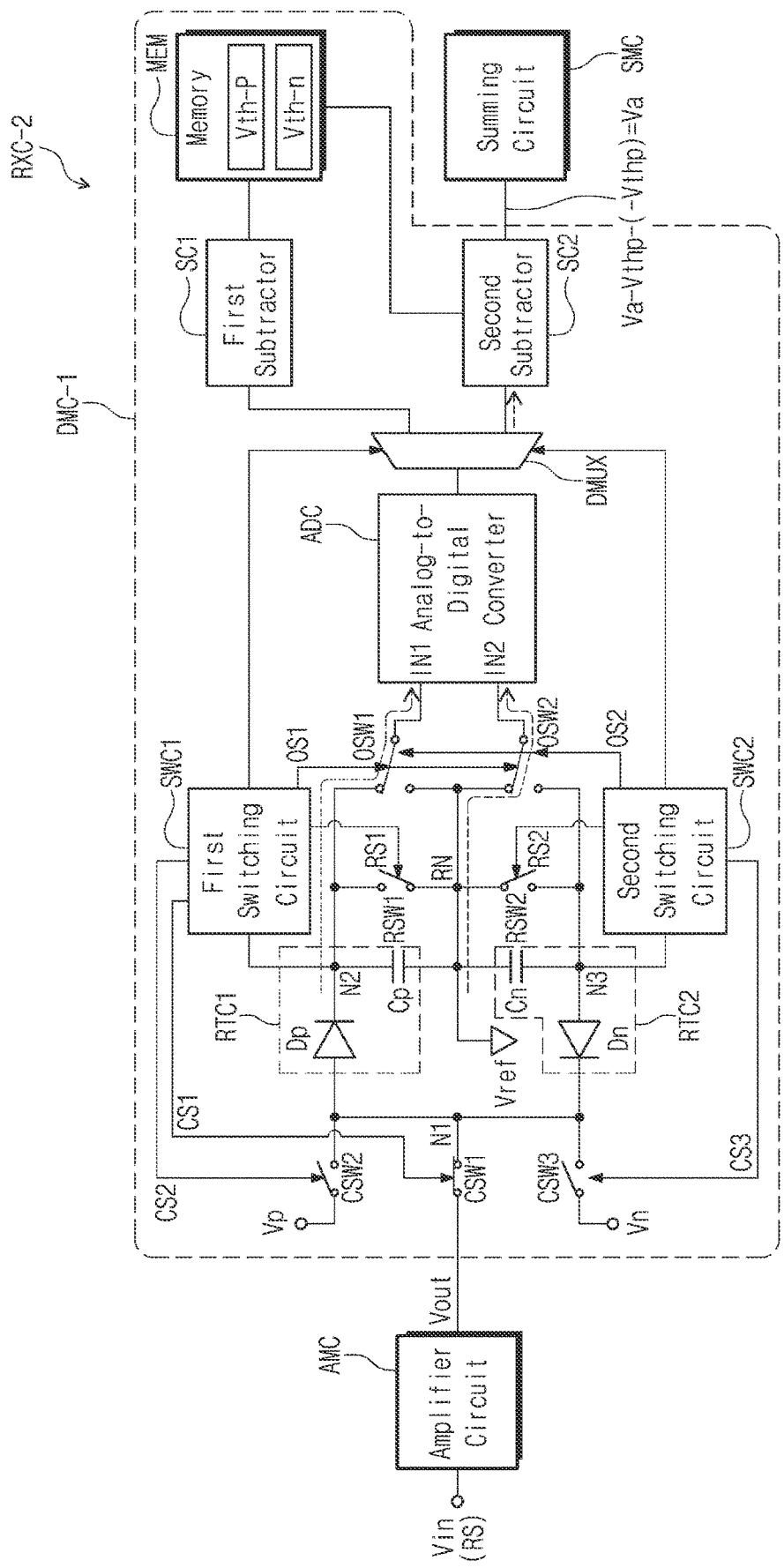

Referring to FIGS. 14 and 15D, in the sensing period following the threshold voltage measurement period, the first connection switching element CSW1 may be turned on by the first connection switching signal CS1 activated. The amplifier circuit AMC may be connected to the demodulating circuit DMC-1 by the first connection switching element CSW1 which is turned on.

The second and third connection switching elements CSW2 and CSW3 may be turned off by the second and third reset switching signals CS2 and CS3 deactivated. Accordingly, the first and second voltages Vp and Vn may not be applied to the demodulating circuit DMC-1.

Referring to FIGS. 11A, 14, and 15D, the positive-polarity voltage +Va may be applied to the second node N2 through the first diode Dp disposed in the forward direction. As described with reference to FIG. 11A, the voltage of the second node N2 may be "Vref+Va−Vthp". Also, as the first output switching signal OS1 activated is applied to the first and second output switching elements OSW1 and OSW2, the first rectifier circuit RTC1 may be connected to the analog-to-digital converter ADC.

As described above, because a sensing voltage value processed by the analog-to-digital converter ADC is set to "Va−Vthp", the first digital signal DGT1 may have a value of "Va−Vthp".

In the sensing period, the demultiplexer circuit DMUX may connect the analog-to-digital converter ADC to the second subtractor SC2 under control of the second switching control part SWC2.

The second subtractor SC2 may be provided with the first digital signal DGT1 from the analog-to-digital converter ADC and may be provided with the first threshold value −Vthp from the memory MEM. The second subtractor SC2 may subtract the first threshold value −Vthp from the first digital signal DGT1. An output value of the second subtractor SC2 may be Va (=Va−Vthp−(−Vthp)). Because the first digital signal DGT1 and the first threshold value −Vthp are digital values, the output value of the second subtractor SC2 may also be substantially a digital value.

The above operation may be defined as a threshold voltage compensation operation. The output value of the second subtractor SC2 may be defined as a sensing value sensed by the first and second sensing parts SP1 and SP2.

The first threshold voltage Vthp of the first diode Dp may vary due to various factors (e.g., a use time or a temperature of a diode). Accordingly, in the case where the first threshold voltage Vthp is included in a sensing value, the sensing value may be inaccurate. In an embodiment of the present disclosure, the demodulating circuit DMC-1 may remove the threshold voltage Vthp of the first diode Dp and may output the sensing value. Accordingly, a more accurate sensing value may be output.

Although not illustrated, the analog-to-digital converter ADC may output the second digital signal DGT2 as described with reference to FIG. 11B. The second subtractor SC2 may subtract the second threshold value+Vthn from the second digital signal DGT2. An output value of the second subtractor SC2 may be −Va (=−Va+Vthn−(+Vthn)). Accordingly, the demodulating circuit DMC-1 may remove the threshold voltage Vthn of the second diode Dn and may output the sensing value.

The sensing values output from the second subtractor SC2 may be provided to the summing circuit SMC. As described above, the summing circuit SMC may add and output "N" sensing values output from the second subtractor SC2.

Figure 16:
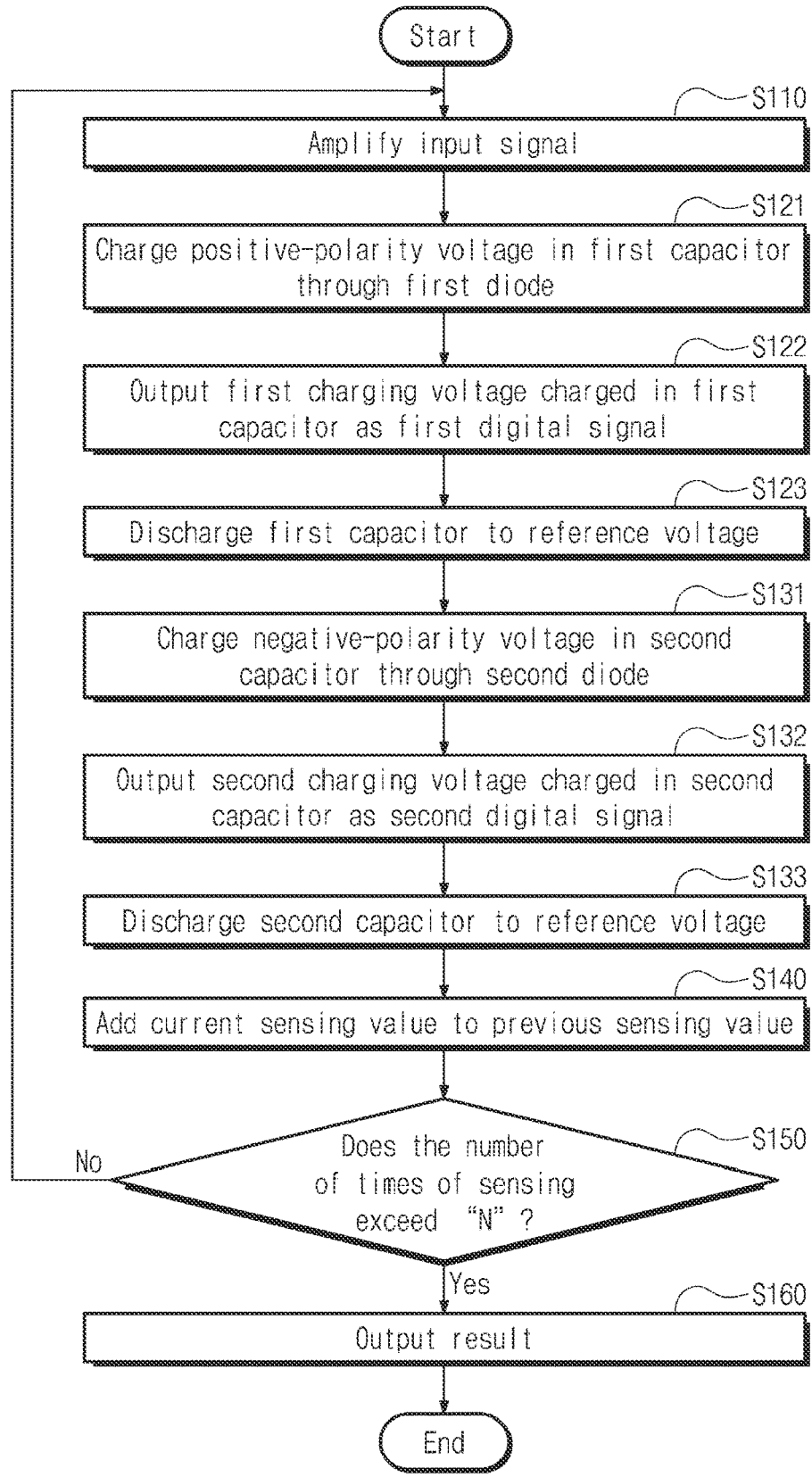
FIG. 16 is a flowchart for describing an operating operation of a receive circuit illustrated in FIG. 7.
Figure 17:
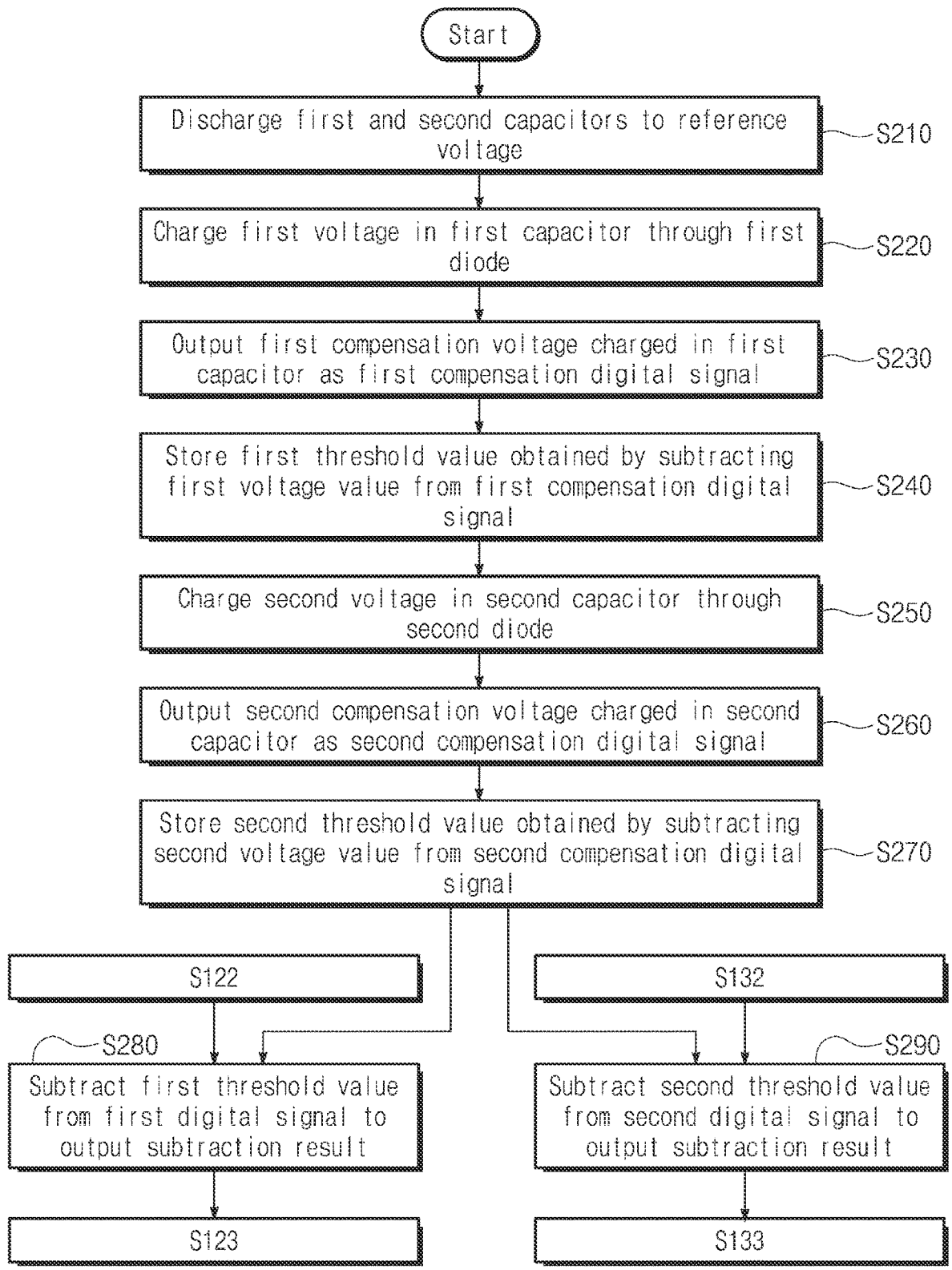
FIG. 17 is a flowchart for describing an operating operation of a receive circuit illustrated in FIG. 13.

FIG. 16 is a flowchart for describing an operation of a receive circuit illustrated in FIG. 7. FIG. 17 is a flowchart for describing an operation of a receive circuit illustrated in FIG. 13.

FIG. 16 shows an operation in the sensing period described above, FIG. 17 shows an operation in the threshold voltage measurement period described above.

Referring to FIGS. 7 and 16, in operation S110, the input signal Vin may be amplified and output. In operation S121, the positive-polarity voltage +Va of the amplified input signal Vin may be charged in the first capacitor Cp through the first diode Dp disposed in the forward direction. In operation S122, a first charging voltage charged in the first capacitor Cp may be converted into a digital signal by the analog-to-digital converter ADC, and the first digital signal DGT1 may be output as a conversion result. In operation S123, the first capacitor Cp may be discharged to the reference voltage Vref by the first reset switching element RSW1.

In operation S131, the negative-polarity voltage −Va of the amplified input signal Vin may be charged in the second capacitor Cn through the second diode Dn disposed in the reverse direction. In operation S132, a second charging voltage charged in the second capacitor Cn may be converted into a digital signal by the analog-to-digital converter ADC, and the second digital signal DGT2 may be output as a conversion result. In operation S133, the second capacitor Cn may be discharged to the reference voltage Vref by the second reset switching element RSW2.

In operation S140, a current sensing value may be added to a previous sensing value. The first and second digital signals DGT1 and DGT2 may be added as sensing values. In operation S150, whether the number of sensing operations exceeds "N" may be determined. The number of sensing operations may be defined as the number of operations in which the demodulating circuit DMC processes and outputs a signal. When the number of sensing operations does not exceed "N", operation S110 may be performed. When the number of sensing operations exceeds "N", that is, as described above, when the summing circuit SMC adds "N" sensing values, a summing value may be output in operation S160.

Referring to FIGS. 13 and 17, in operation S210, the first and second capacitors Cp and Cn may be discharged to the reference voltage Vref. In operation S220, the first voltage Vp may be charged in the first capacitor Cp through the first diode Dp disposed in the forward direction. In operation S230, the first compensation voltage Vc1 charged in the first capacitor Cp may be converted into a digital signal by the analog-to-digital converter ADC, and the first compensation digital signal Dc1 may be output as a conversion result. In operation S240, the first voltage value Vp may be subtracted from the first compensation digital signal Dc1 by the first subtractor SC1, and the first threshold value −Vthp output from the first subtractor SC1 may be stored in the memory MEM.

In operation S250, the second voltage Vn may be charged in the second capacitor Cn through the second diode Dn disposed in the reverse direction. In operation S260, the second compensation voltage Vc2 charged in the second capacitor Cn may be converted into a digital signal by the analog-to-digital converter ADC, and the second compensation digital signal Dc2 may be output as a conversion result. In operation S270, the second voltage value Vn may be added to the second compensation digital signal Dc2 by the first subtractor SC1, and the second threshold value+Vthn output from the first subtractor SC1 may be stored in the memory MEM.

Afterwards, in an operation of the sensing period illustrated in FIG. 16, operation S280 following operation S122 and operation S290 following operation S132 may be performed. In operation S280, the second subtractor SC2 may subtract the first threshold value −Vthp from the first digital signal DGT1 and may output a subtraction result. Afterwards, operation S123 may be performed. In operation S290, the second subtractor SC2 may subtract the second threshold value+Vthn from the second digital signal DGT2 and may output a subtraction result. Afterwards, operation S133 may be performed. Then, operation S140, operation S150, and operation S160 may be performed.

FIGS. 18A to 18J are diagrams for describing an operation of a receive circuit according to another embodiment of the present disclosure.

Below, a configuration of a receive circuit RXC-3 will be described with reference to FIG. 18A, and a sequential operation of the receive circuit RXC-3 will be described with reference to FIGS. 18A to 18J. Also, a configuration of the receive circuit RXC-3 illustrated in FIG. 18A will be mainly described based on a difference with the receive circuit RXC illustrated in FIG. 7.

Figure 18A:
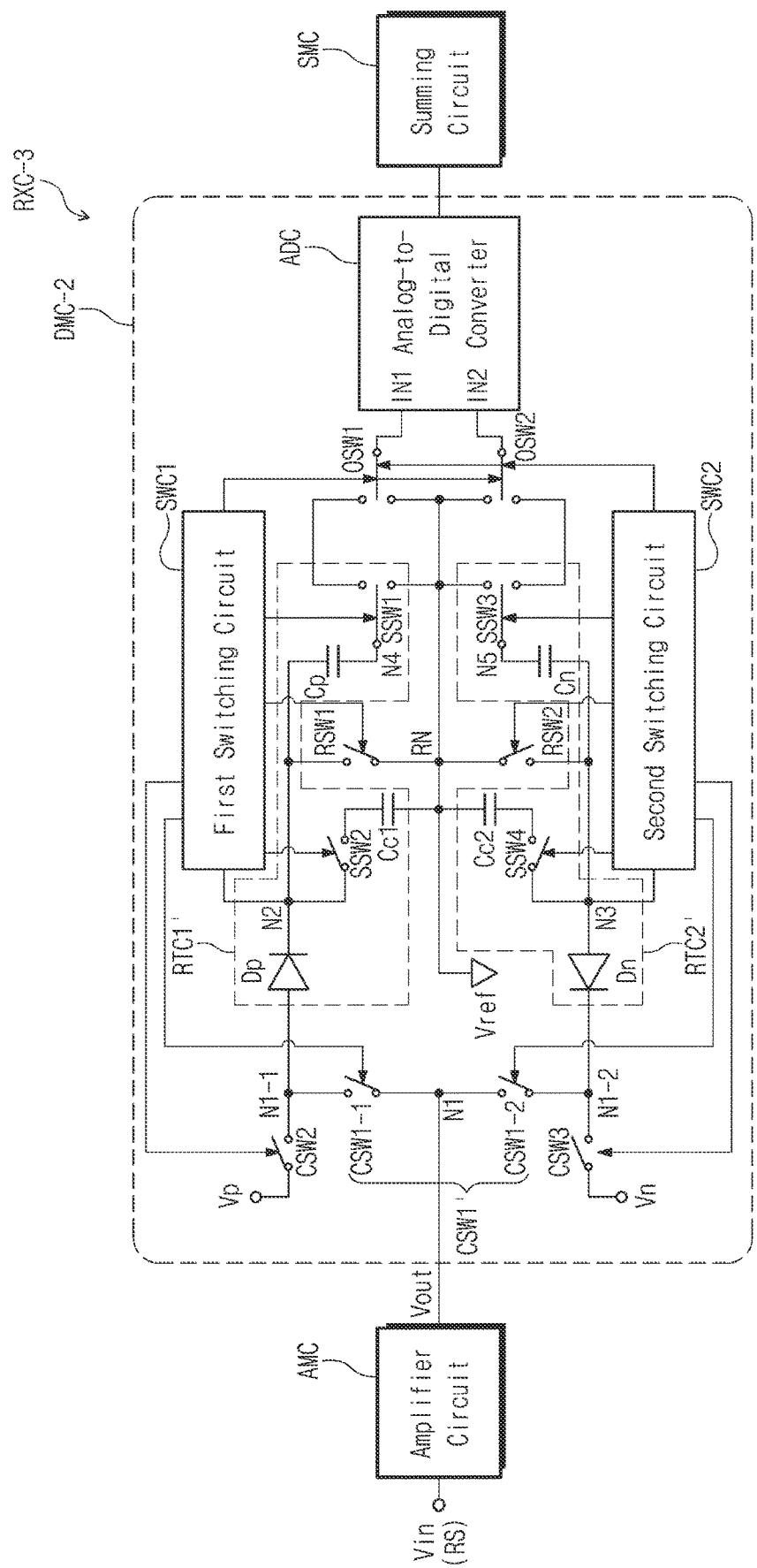
FIGS. 18A, 18B, 18C, 18D, 18E, 18F, 18G, 18H, 18I and 18J are diagrams for describing an operation of a receive circuit according to an embodiment of the present disclosure.

Referring to FIG. 18A, a first connection switching element CSW1' may include a (1-1)-th connection switching element CSW1-1 and a (1-2)-th connection switching element CSW1-2.

The connection switching element CSW1-1 may be connected between the first node N1 and a (1-1)-th node N1-1. The output terminal of the amplifier circuit AMC may be connected to the first node N1, and an input terminal of a first rectifier circuit RTC1' (e.g., an anode of the first diode Dp) may be connected to the (1-1)-th node N1-1. The (1-1)-th connection switching element CSW1-1 may control the connection of the amplifier circuit AMC and the first rectifier circuit RTC1' under control of the first switching control part SWC1.

The connection switching element CSW1-2 may be connected between the first node N1 and a (1-2)-th node N1-2. An input terminal of a second rectifier circuit RTC2' (e.g., a cathode of the second diode Dn) may be connected to the (1-2)-th node N1-2. The (1-2)-th connection switching element CSW1-2 may control the connection of the amplifier circuit AMC and the second rectifier circuit RTC2' under control of the second switching control part SWC2.

The second connection switching element CSW2 may be connected to the (1-1)-th node N1-1, and the third connection switching element CSW3 may be connected to the (1-2)-th node N1-2.

The first rectifier circuit RTC1' may include the first diode Dp, the first capacitor Cp, first and second selection switching elements SSW1 and SSW2, and a first compensation capacitor Cc1.

The first diode Dp may be connected between the (1-1)-th node N1-1 and the second node N2 in the forward direction. The first capacitor Cp may include the first electrode connected to the second node N2 and the second electrode connected to the first selection switching element SSW1. A contact point between the first selection switching element SSW1 and the second electrode of the first capacitor Cp may be defined as a fourth node N4.

The first selection switching element SSW1 may selectively connect the second electrode of the first capacitor Cp to the reference node RN and the first output switching element OSW1 under control of the first switching control part SWC1. The first compensation capacitor Cc1 may include a first electrode connected to the second selection switching element SSW2 and a second electrode connected to the reference node RN. The second selection switching element SSW2 may switch the connection of the second node N2 and the first electrode of the first compensation capacitor Cc1 under control of the first switching control part SWC1.

The first reset switching element RSW1 may be connected between the second node N2 and the reference node RN and may control the connection of the second node N2 and the reference node RN under control of the first switching control part SWC1.

The second rectifier circuit RTC2' may include the second diode Dn, the second capacitor Cn, third and fourth selection switching elements SSW3 and SSW4, and a second compensation capacitor Cc2.

The second diode Dn may be connected between the (1-2)-th node N1-2 and the third node N3 in the reverse direction. The second capacitor Cn may include the first electrode connected to the third node N3 and the second electrode connected to the third selection switching element SSW3. A contact point between the third selection switching element SSW3 and the second electrode of the second capacitor Cn may be defined as a fifth node N5.

The third selection switching element SSW3 may selectively connect the second electrode of the second capacitor Cn to the reference node RN and the second output transistor OSW2 under control of the second switching control part SWC2. The second compensation capacitor Cc2 may include a first electrode connected to the fourth selection switching element SSW4 and a second electrode connected to the reference node RN. The fourth selection switching element SSW4 may control the connection of the third node N3 and the first electrode of the second compensation capacitor Cc2 under control of the second switching control part SWC2.

The second reset switching element RSW2 may be connected between the third node N3 and the reference node RN and may control the connection of the third node N3 and the reference node RN under control of the second switching control part SWC2.

With reference to the above operations, the threshold voltage measurement operation for the second diode Dn may be performed at the timing following the threshold voltage measurement operation of the first diode Dp and may be substantially the same as the threshold voltage measurement operation for the first diode Dp. Also, the sensing operation of the second rectifier circuit RTC2' may be performed at the timing following the sensing operation of the first rectifier circuit RTC1' and may be substantially the same as the sensing operation of the first rectifier circuit RTC1'.

Accordingly, below, the threshold voltage measurement operation for the first diode Dp and the sensing operation of the first rectifier circuit RTC1' will be mainly described with reference to FIGS. 18A to 18J, and the threshold voltage measurement operation for the second diode Dn and the sensing operation of the second rectifier circuit RTC2' will be described briefly without drawings.

Below, a threshold voltage measurement operation for the first diode Dp will be described with reference to FIGS. 18A to 18E. The sensing operation of the first rectifier circuit RTC1' will be described with reference to FIGS. 18F to 18J.

Referring to FIG. 18A, the (1-1)-th and (1-2)-th connection switching elements CSW1-1 and CSW1-2 and the second and third connection switching elements CSW2 and CSW3 may be turned off, and thus, the first and second rectifier circuits RTC1' and RTC2' and the amplifier circuit AMC may be disconnected from each other.

Figure 18B:
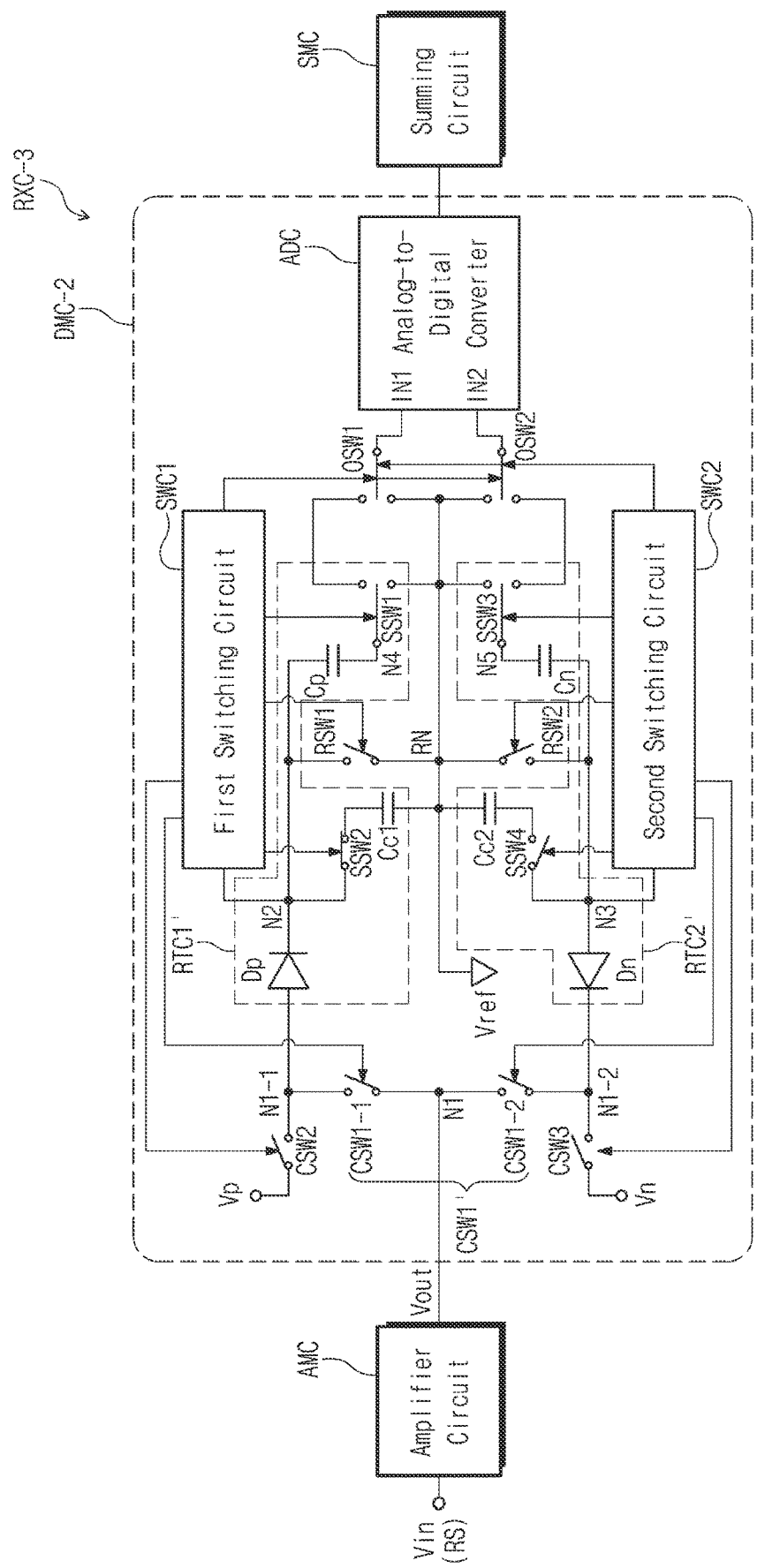

Referring to FIG. 18B, the second selection switching element SSW2 may be turned on, and thus, the first electrode of the first compensation capacitor Cc1 may be connected to the second node N2. Accordingly, the first compensation capacitor Cc1 may be connected to the first diode Dp.

Figure 18C:
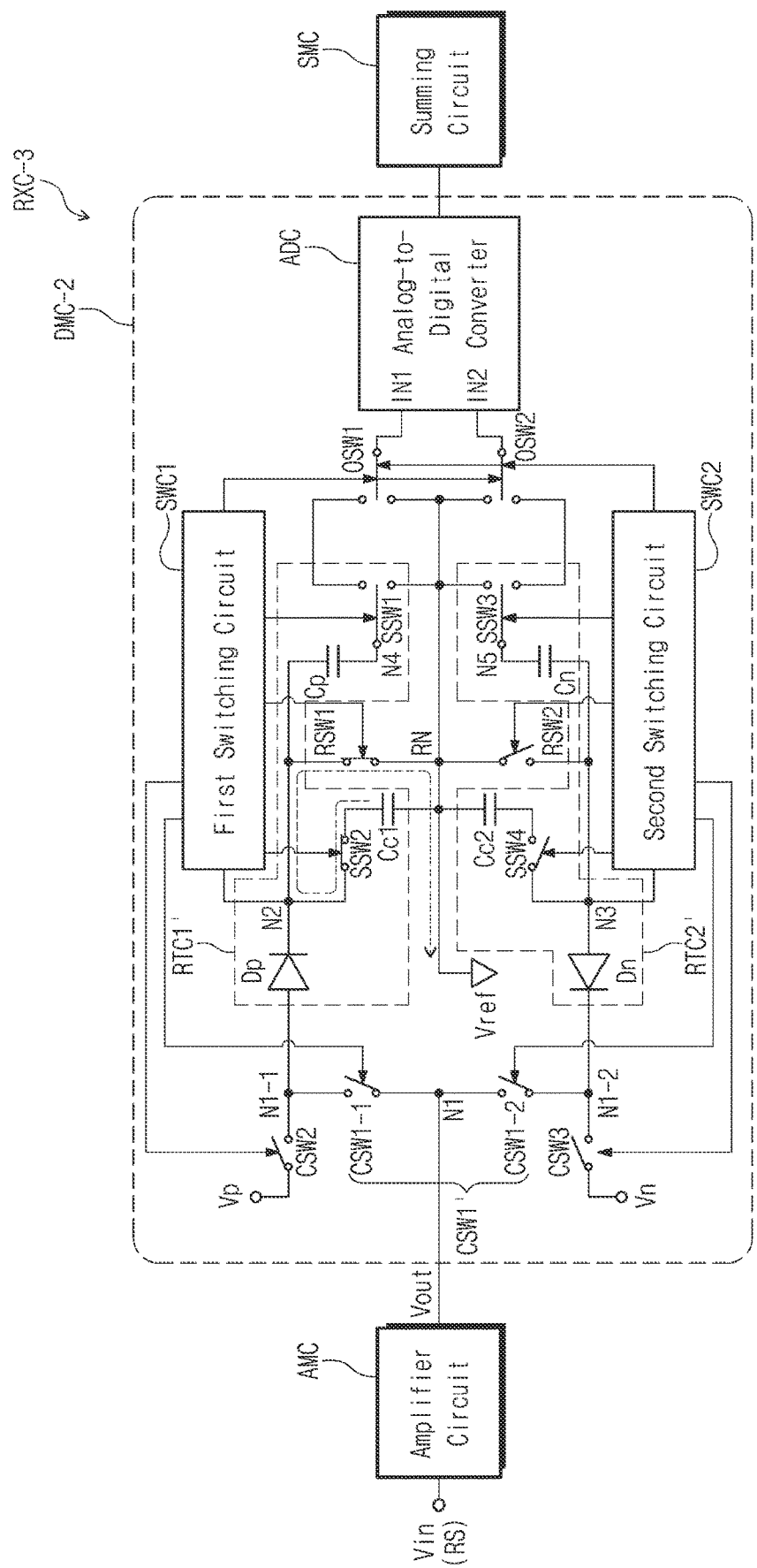

Referring to FIG. 18C, the first reset switching element RSW1 may be turned on, and thus, the first compensation capacitor Cc1 may be discharged to the reference voltage Vref.

Figure 18D:
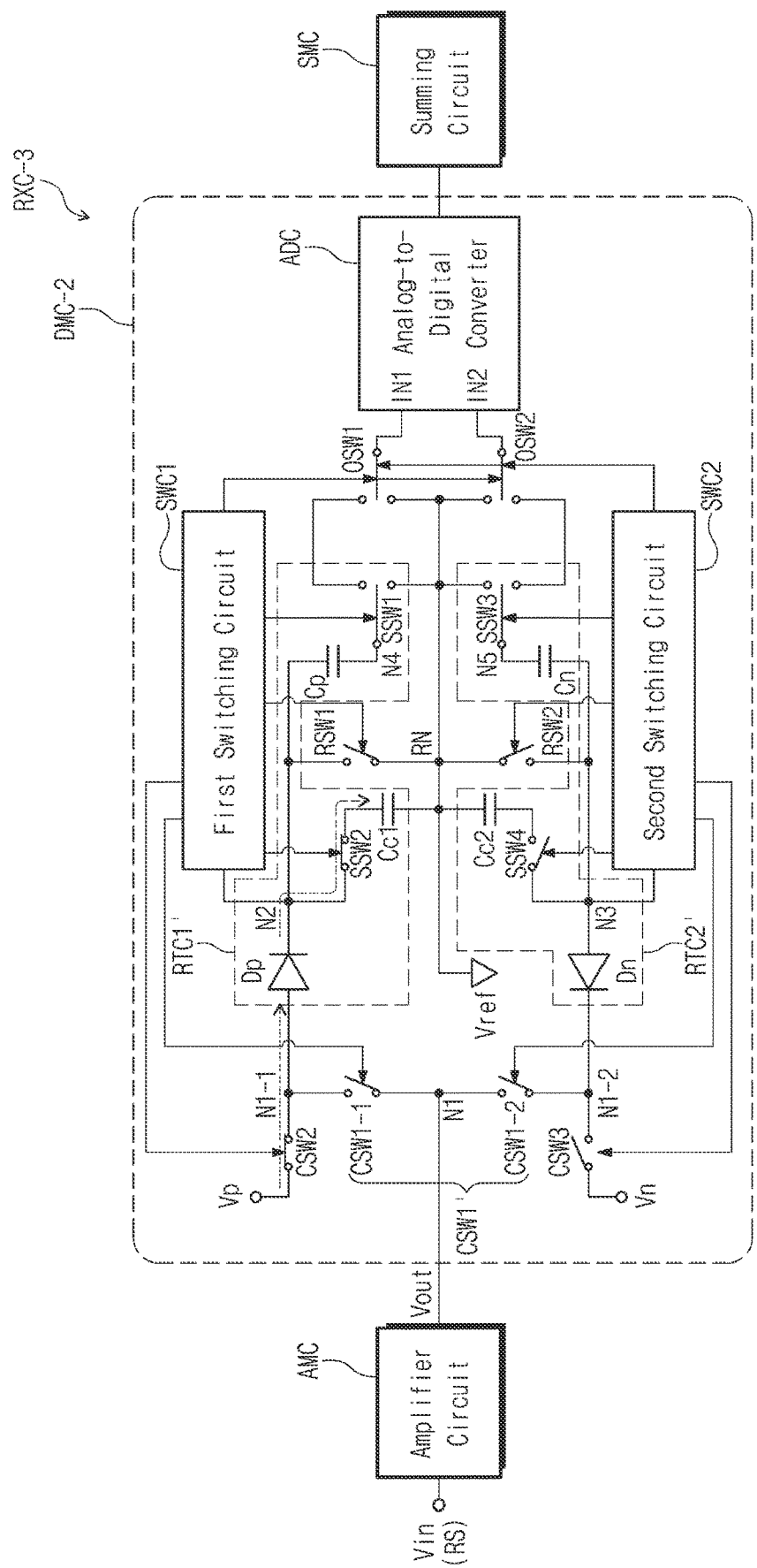

Referring to FIG. 18D, the first reset switching element RSW1 may be turned off and the second connection switching element CSW2 is turned on. As the second connection switching element CSW2 is turned on, the first compensation voltage Vc1 may be stored in the first compensation capacitor Cc1 through the first diode Dp. In this case, the voltage of the second node N2 may be "Vref+Vp−Vthp". A voltage difference (Vp−Vthp) between the second node N2 and the reference node RN may be charged in the first compensation capacitor Cc1 as the first compensation voltage Vc1.

Figure 18E:
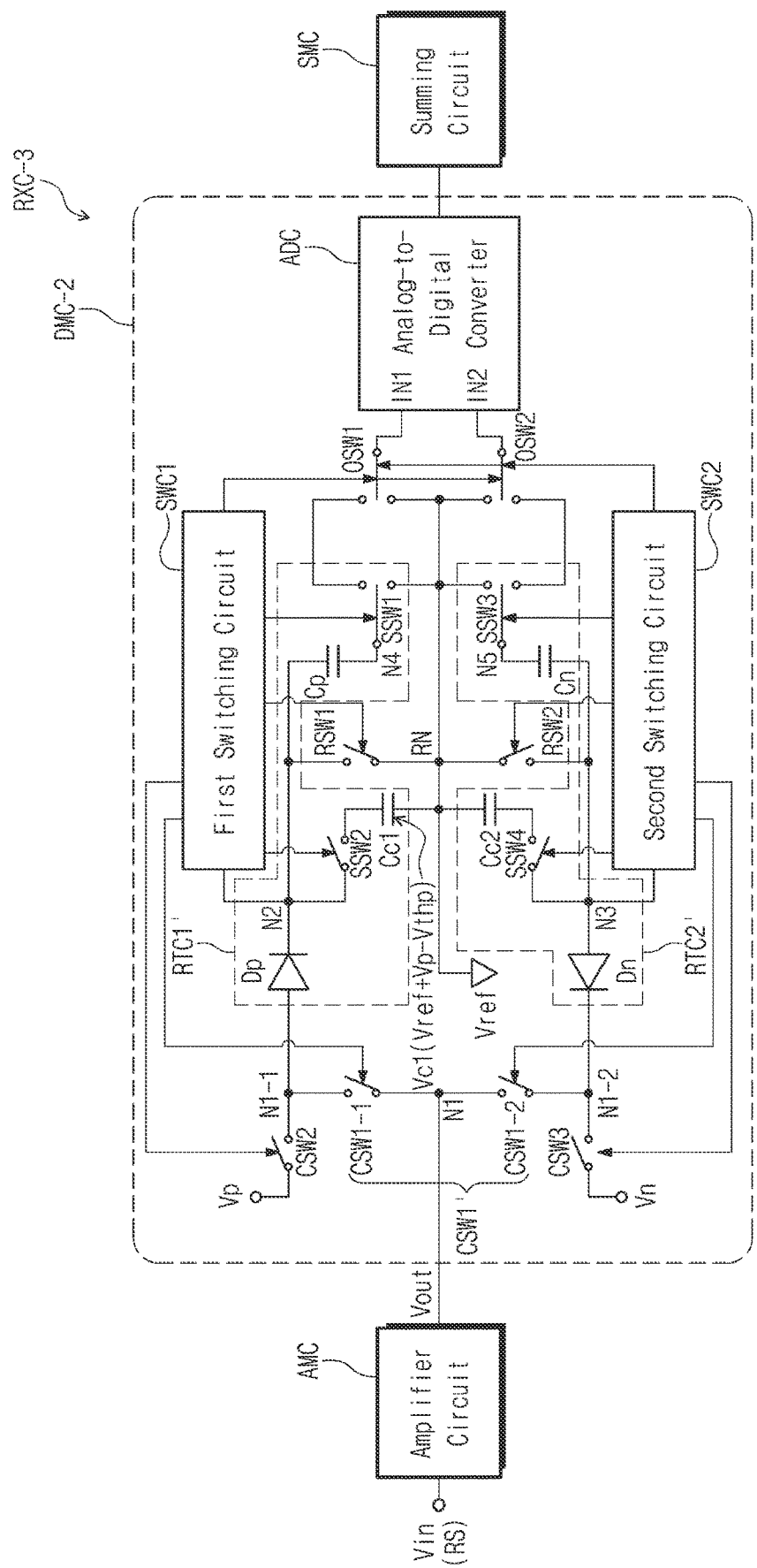

Referring to FIG. 18E, the second connection switching element CSW2 and the second selection switching element SSW2 may be turned off, and thus, the first compensation voltage Vc1 may be stored in the first compensation capacitor Cc1.

The above operation may be defined as an operation of measuring the first threshold voltage Vthp. Although not illustrated, after the first rectifier circuit RTC1 ' performs the operation of measuring the first threshold voltage Vthp, at the following timing, the second rectifier circuit RTC2' may perform an operation of measuring the second threshold voltage Vthn to be the same as the first rectifier circuit RTC1'. Accordingly, the second compensation voltage Vc2 may be stored in the second compensation capacitor Cc2 of the second rectifier circuit RTC2', and the second compensation voltage Vc2 may have a value of "−Vn+Vthn".

Figure 18F:
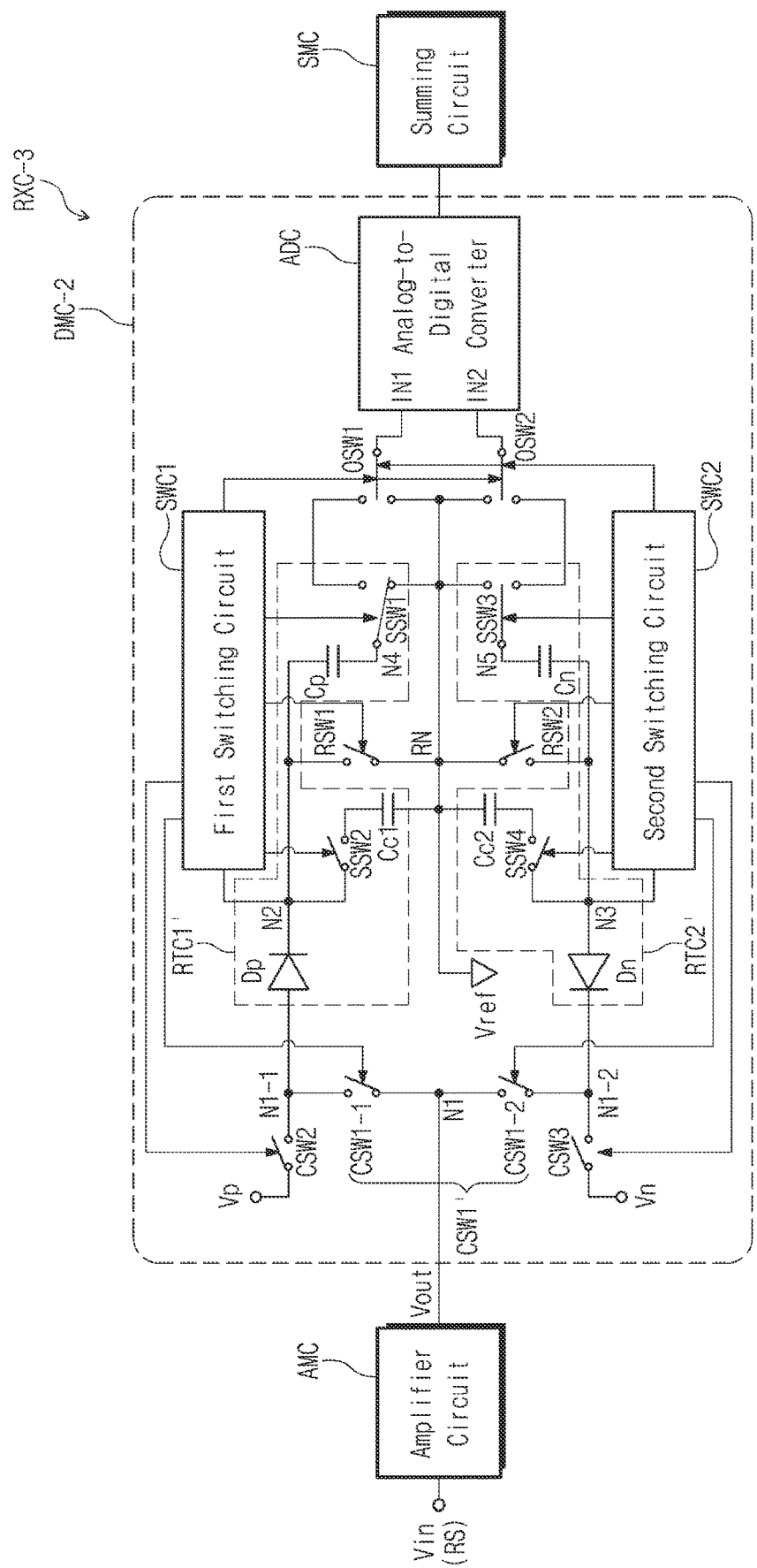

Referring to FIG. 18F, the first selection switching element SSW1 may connect the second electrode of the first capacitor Cp to the reference node RN under control of the first switching control part SWC1.

Figure 18G:
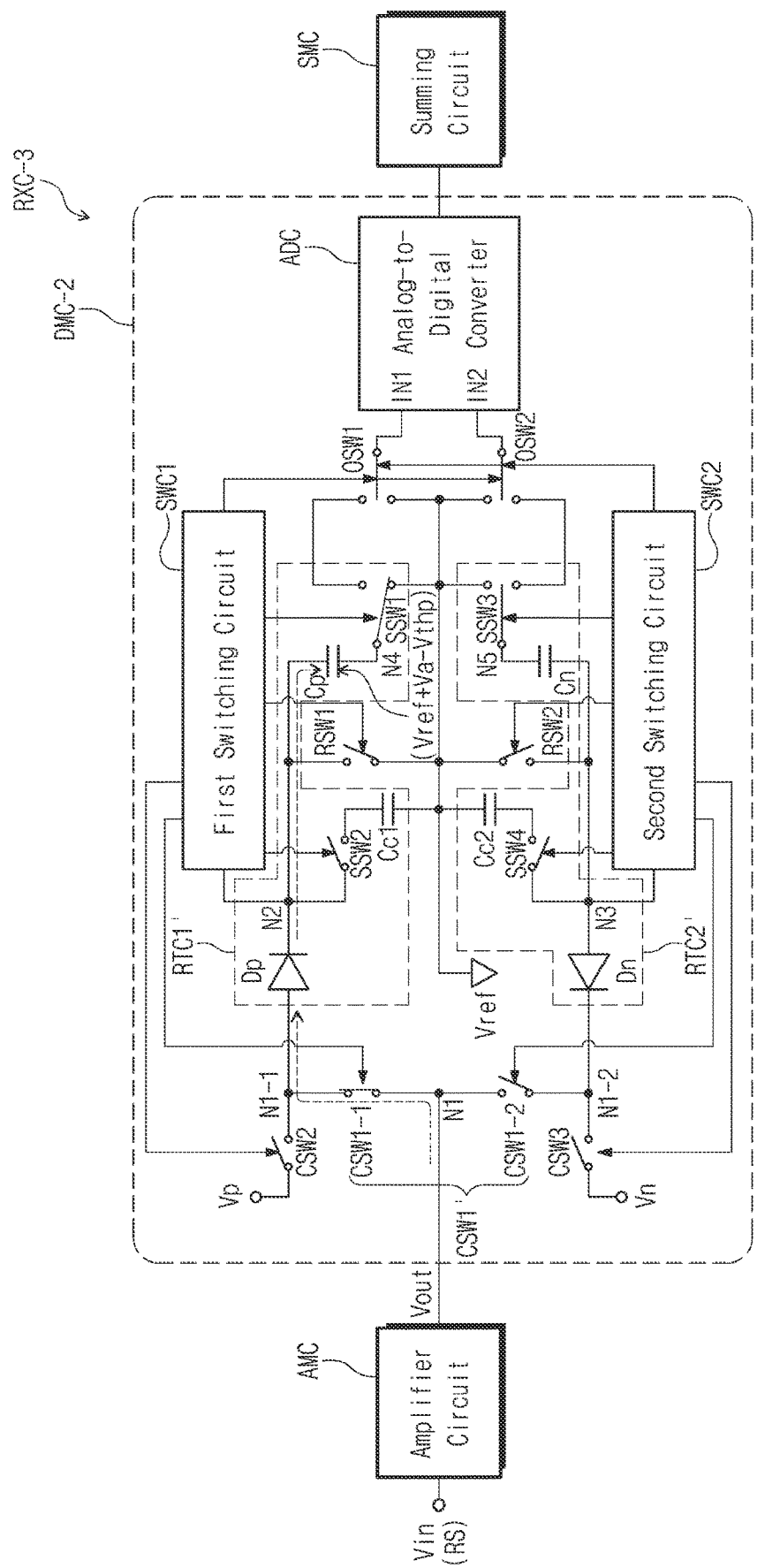

Referring to FIG. 18G, the (1-1)-th connection switching element CSW1-1 may be turned on, and thus, the amplifier circuit AMC may be connected to the first diode Dp. In this case, as described with reference to FIG. 11A, a voltage value of "Va−Vthp" may be stored in the first capacitor Cp.

Figure 18H:
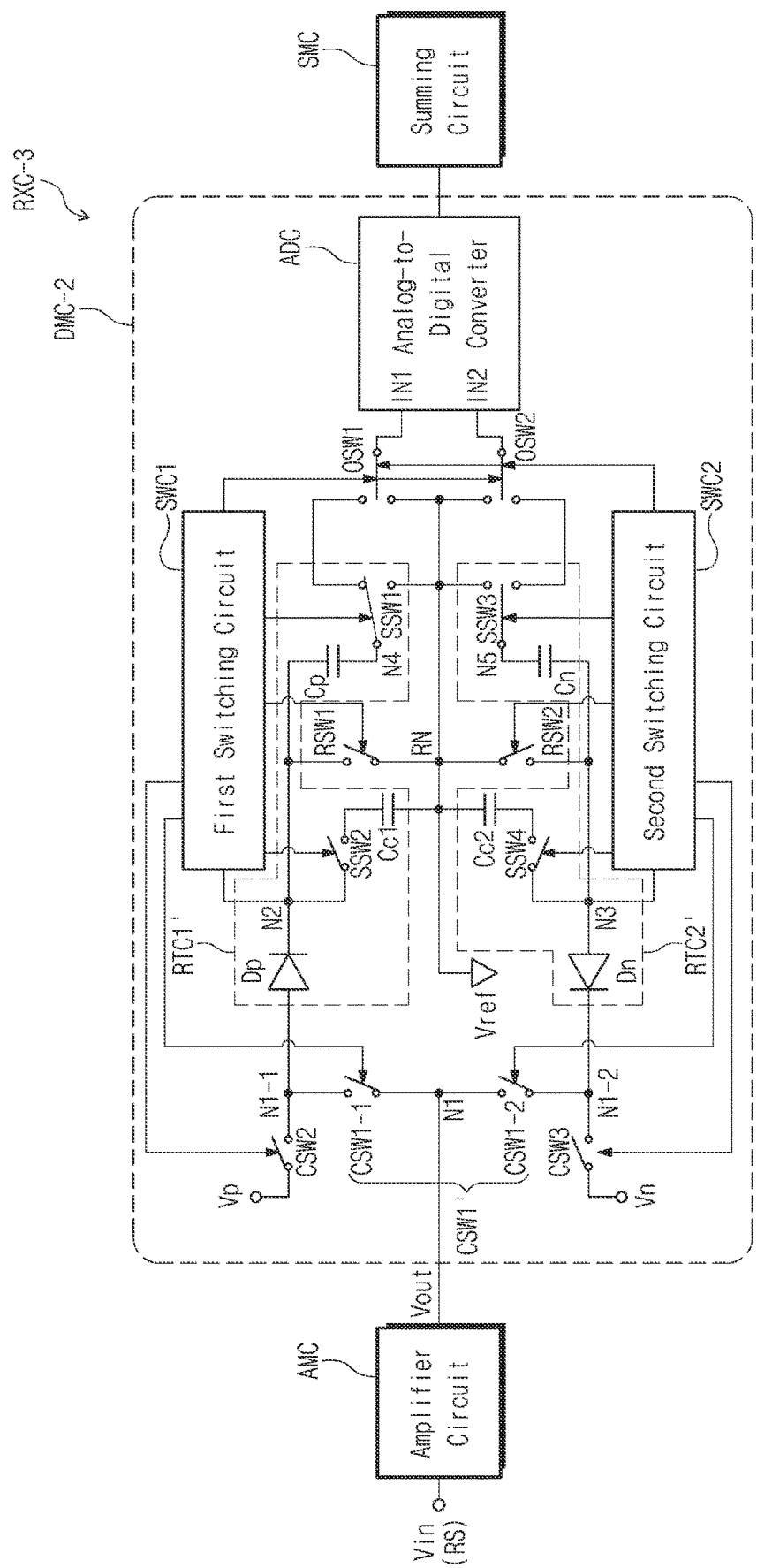

Referring to FIG. 18H, the (1-1)-th connection switching element CSW1-1 may be turned off. The first selection switching element SSW1 may connect the second electrode of the first capacitor Cp to the first output switching element OSW1 under control of the first switching control part SWC1.

Figure 18I:
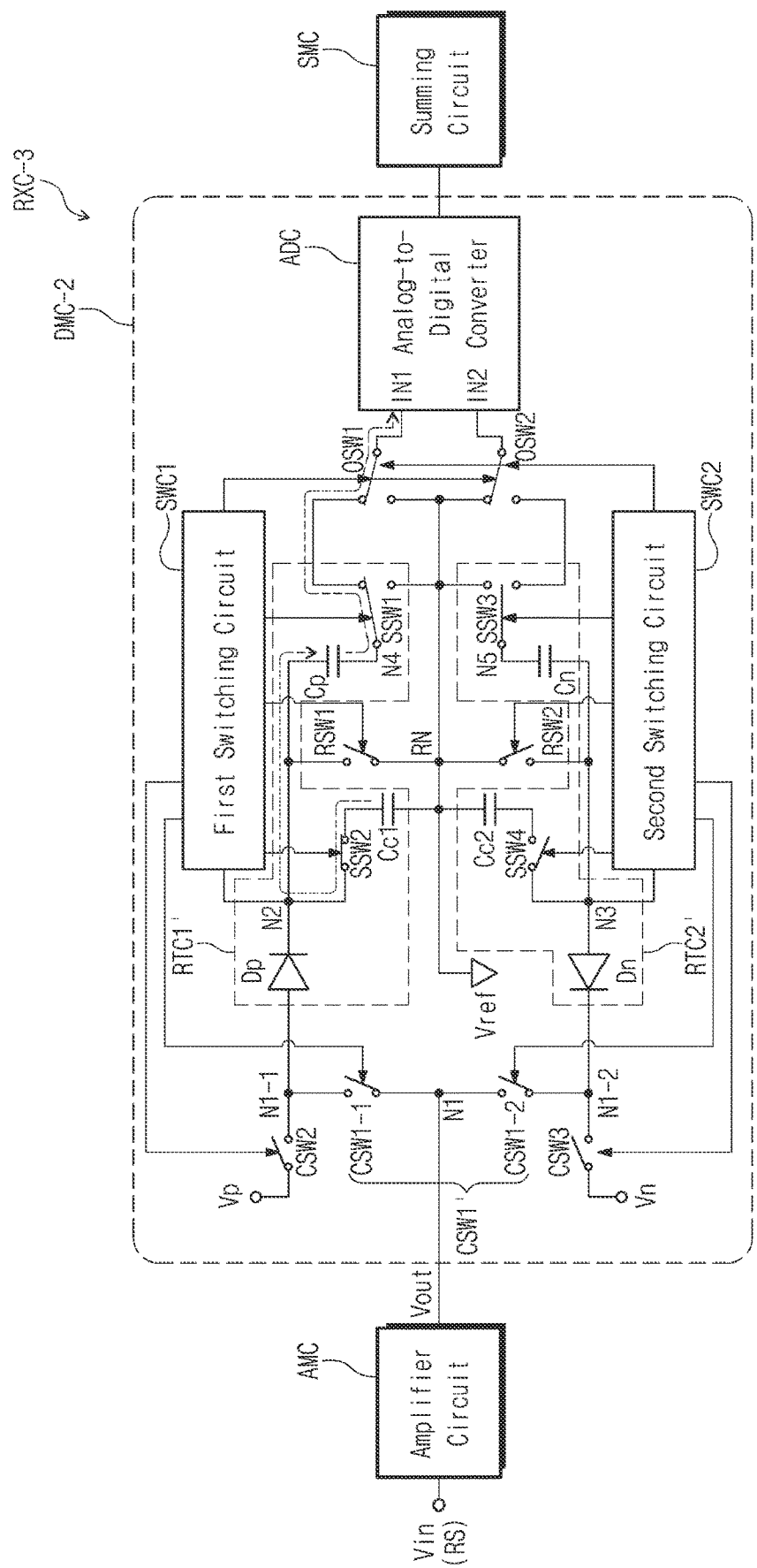

Referring to FIG. 18I, the second selection switching element SSW2 may be turned on, and thus, the first compensation capacitor Cc1 and the first capacitor Cp may be connected. In this case, a voltage of the fourth node N4 may be set to a value that is obtained by subtracting a value charged in the first capacitor Cp from a value charged in the first compensation capacitor Cc1.

The voltage of the fourth node N4 may be set to a value of "Vp−Va" (=(+Vp−Vthp)−(Va−Vthp)). As the first threshold voltage Vthp is removed, the compensation for a threshold voltage may be made. In this case, the sensing operation may be performed regardless of a change in the first threshold voltage Vthp.

The first output switching element OSW1 and the second output switching element OSW2 may be respectively connected to the first selection switching element SSW1 and the reference node RN. As a result, the first rectifier circuit RTC1' may be connected to the analog-to-digital converter ADC. The voltage of the fourth node N4 may be converted into a digital signal by the analog-to-digital converter ADC, and the digital signal may be provided to the summing circuit SMC.

Figure 18J:
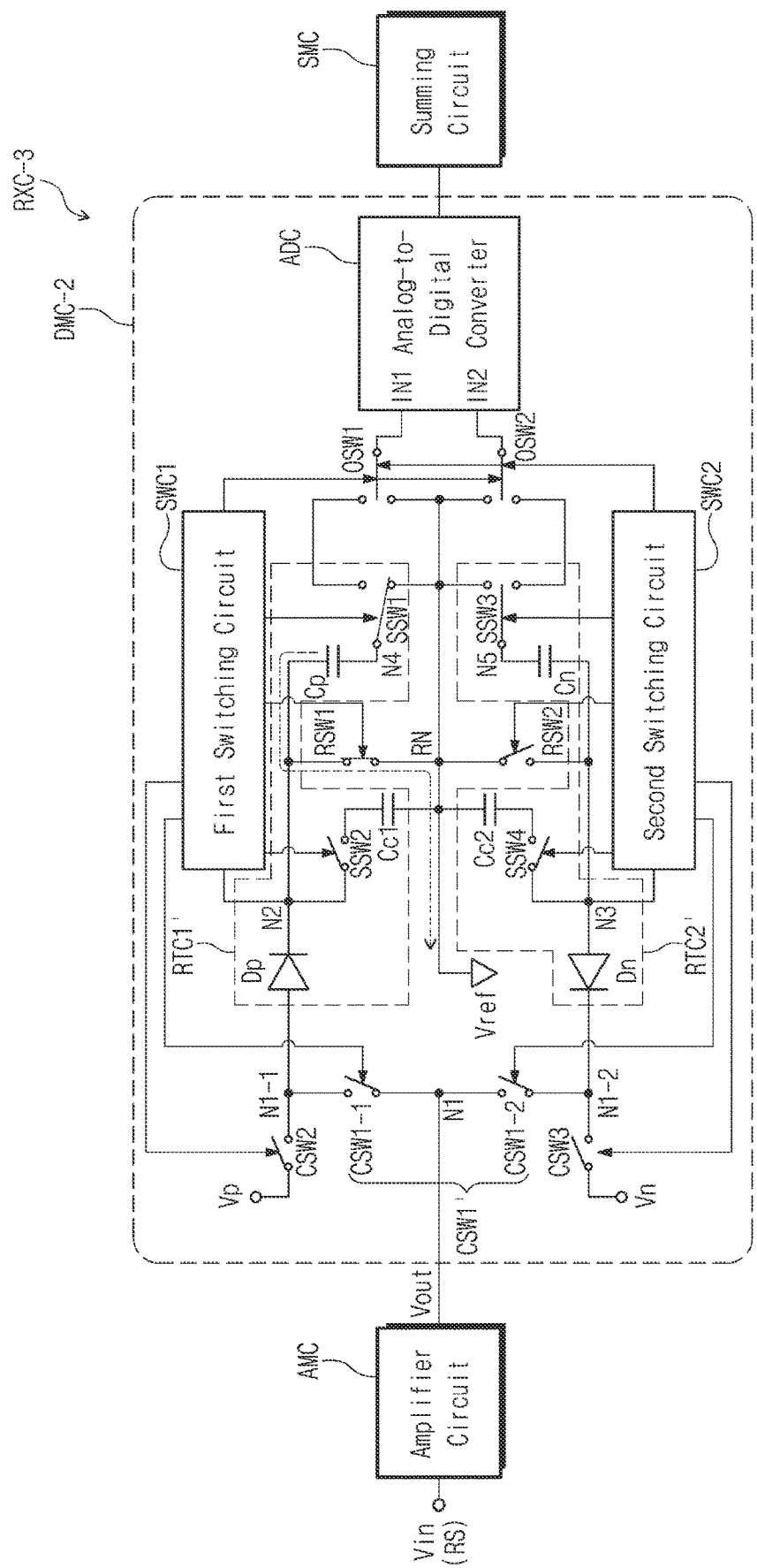

Referring to FIG. 18J, the first selection switching element SSW1 may connect the first capacitor Cp to the reference node RN. The second selection switching element SSW2 may be turned off. As the first reset switching element RSW1 is turned on, the first capacitor Cp may be connected between the second node N2 and the reference node RN. Accordingly, the voltage charged in the first capacitor Cp may be discharged to the reference voltage Vref.

Although not illustrated, as in the above description given with reference to FIG. 13, a first subtractor for removing the first voltage Vp from the output of the analog-to-digital converter ADC may be further used, and may be interposed between the analog-to-digital converter ADC and the summing circuit SMC. Also, as in the above description given with reference to FIG. 13, the noise filter NF may be further used and may be connected to the output terminal of the amplifier circuit AMC.

The above operation may be defined as a first sensing operation for the positive-polarity voltage +Va. Although not illustrated, after the first rectifier circuit RTC1' performs the first sensing operation, at the following timing, the second rectifier circuit RTC2' may perform a second sensing operation for the negative-polarity voltage −Va to be the same as the first rectifier circuit RTC1'. Accordingly, a voltage of the fourth node N5 may be set to a value of "Va−Vn" (=(−Vn+Vthn)−(−Va+Vthn)). As the second threshold voltage Vthn is removed, the compensation for a threshold voltage may be made. In this case, the sensing operation may be performed regardless of a change in the second threshold voltage Vthn.

The first output switching element OSW1 and the second output switching element OSW2 may be respectively connected to the reference node RN and the third selection switching element SSW3; in this case, and the voltage of the fifth node N5 may be converted into a digital signal by the analog-to-digital converter ADC, and the digital signal may be provided to the summing circuit SMC.

At the following timing, the second capacitor Cn may be connected between the third node N3 and the reference node RN by the third selection switching element SSW3 and the second reset switching element RSW2, so as to be discharged to the reference voltage Vref.

According to an embodiment of the present disclosure, a receive circuit may be implemented by using elements, the number of which is less than that of an exist IQ demodulator. Also, because the receive circuit outputs a demodulation signal by using an input signal without using a carrier wave, the demodulation signal may be normally output regardless of a phase difference of the carrier wave and the input signal. Also, the receive circuit may compensate for a threshold voltage of a diode to output the demodulation signal.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. An input sensor comprising:
   a plurality of sensing parts;
   an amplifier circuit connected to the sensing parts;
   a rectifier circuit connected to the amplifier circuit;
   an analog-to-digital converter connected to the rectifier circuit;
   an output switching element connected between the rectifier circuit and the analog-to-digital converter, and controlling a connection of the rectifier circuit and the analog-to-digital converter;
   a first connection switching element connected between the amplifier circuit and the rectifier circuit, and controlling a connection of the amplifier circuit and the rectifier circuit;
   a second connection switching element connected between a first voltage line supplying a first voltage and the rectifier circuit, and connecting a first voltage line to the rectifier circuit; and
   a third connection switching element connected between a second voltage line supplying a second voltage and the rectifier circuit and connecting a second voltage line to the rectifier circuit.

2. The input sensor of claim 1, wherein the rectifier circuit includes:
   a first rectifier circuit connected between the first, second, and third connection switching elements and the analog-to-digital converter, and connected in a forward direction; and
   a second rectifier circuit connected between the first, second, and third connection switching elements and the analog-to-digital converter, and connected in a reverse direction.

3. The input sensor of claim 2, wherein the first voltage is higher than a reference voltage and the second voltage is lower than the reference voltage.

4. The input sensor of claim 2, wherein the output switching element includes a first output switching element and a second output switching element connected between the rectifier circuit and the analog-to-digital converter, and selectively connecting the analog-to-digital converter to the first rectifier circuit and the second rectifier circuit.

5. The input sensor of claim 4, wherein the first rectifier circuit includes:
   a first diode connected between a first node and a second node in the forward direction; and
   a first capacitor including a first electrode connected to the second node and a second electrode connected to a reference node to which a reference voltage is applied,
   wherein the second rectifier circuit includes:
   a second diode connected between the first node and a third node in the reverse direction; and
   a second capacitor including a first electrode connected to the third node and a second electrode connected to the reference node, and
   wherein the first, second, and third connection switching elements are connected to the first node.

6. The input sensor of claim 5, wherein, to connect the first rectifier circuit and the analog-to-digital converter, the first output switching element connects the second node to the analog-to-digital converter and the second output switching element connects the reference node to the analog-to-digital converter, and
   wherein, to connect the second rectifier circuit and the analog-to-digital converter, the second output switching element connects the third node to the analog-to-digital converter and the first output switching element connects the reference node to the analog-to-digital converter.

7. The input sensor of claim 5, wherein the first output switching element includes:

a first switching element turned on or turned off by a first output switching signal to control a connection of the second node and a first input terminal of the analog-to-digital converter; and a second switching element turned on or turned off by a second output switching signal to control a connection of the reference node and the first input terminal of the analog-to-digital converter, and wherein the second output switching element includes:

a third switching element turned on or turned off by the first output switching signal to control a connection of the reference node and a second input terminal of the analog-to-digital converter; and a fourth switching element turned on or turned off by the second output switching signal to control a connection of the third node and the second input terminal of the analog-to-digital converter.

8. The input sensor of claim 4, wherein, in a threshold voltage measurement period, the first connection switching element is turned off, wherein, in the threshold voltage measurement period, when the second connection switching element is turned on and the first rectifier circuit is connected to the analog-to-digital converter by the first and second output switching elements, the first rectifier circuit receives the first voltage, and the analog-to-digital converter receives a first compensation voltage output from the first rectifier circuit and output a first compensation digital signal, and wherein, in the threshold voltage measurement period, when the third connection switching element is turned on and the second rectifier circuit is connected to the analog-to-digital converter by the first and second output switching elements, the second rectifier circuit receives the second voltage, and the analog-to-digital converter receives a second compensation voltage output from the second rectifier circuit and output a second compensation digital signal.

9. The input sensor of claim 8, further comprising:

a first subtractor outputting a first threshold value by removing a first voltage value defined as a digital value of the first voltage from the first compensation digital signal; and output a second threshold value by removing a second voltage value defined as a digital value of the second voltage from the second compensation digital signal.

10. The input sensor of claim 9, further comprising:

a memory configured to store the first threshold value and the second threshold value.

11. The input sensor of claim 9, wherein, in a sensing period following the threshold voltage measurement period, the first connection switching element is turned on, the second and third connection switching elements are turned off, and an output voltage of the amplifier circuit having a sine wave is applied to the first and second rectifier circuits, an output of the first rectifier circuit is provided to the analog-to-digital converter to convert the output of the first rectifier circuit into a first digital signal when the first rectifier circuit and the analog-to-digital converter are connected by the first and second output switching elements, and an output of the second rectifier circuit is provided to the analog-to-digital converter to convert the output of the second rectifier circuit into a second digital signal when the second rectifier circuit and the analog-to-digital converter are connected by the first and second output switching elements.

12. The input sensor of claim 11, further comprising:

a second subtractor connected to the analog-to-digital converter and subtracting the first threshold value from the first digital signal, subtracting the second threshold value from the second digital signal, and outputting sensing values; and a summing circuit configured to add "N" sensing values output from the second subtractor.

13. The input sensor of claim 12, further comprising:

a demultiplexer circuit connected between the analog-to-digital converter and the first subtractor, and the analog-to-digital converter and the second subtractor, and connecting the analog-to-digital converter with the first subtractor in the threshold voltage measurement period and to connect the analog-to-digital converter with the second subtractor in the sensing period.

14. The input sensor of claim 4, wherein the first connection switching element includes:

a (1-1)-th connection switching element connected between the amplifier circuit and the first rectifier circuit; and a (1-2)-th connection switching element connected between the amplifier circuit and the second rectifier circuit, and wherein the first rectifier circuit includes:

a first diode connected to a (1-1)-th node at which the second connection switching element and the (1-1)-th connection switching element are connected, and a second node in the forward direction;

a first capacitor including a first electrode connected to the second node and a second electrode connected to the analog-to-digital converter;

a first selection switching element connected between the first capacitor and the analog-to-digital converter, and selectively connecting the second electrode of the first capacitor with a reference node and the first output switching element;

a first compensation capacitor including a first electrode connected to the second node and a second electrode connected to the reference node;

a second selection switching element connected between the second node and the first electrode of the first compensation capacitor, and controlling a connection of the second node and the first electrode of the first compensation capacitor; and a first reset switching element connected between the second node and the reference node, and controlling a connection of the second node and the reference node.

15. The input sensor of claim 14, wherein the second rectifier circuit includes:

a second diode connected between a (1-2)-th node at which the third connection switching element and the (1-2)-th connection switching element are connected, and a third node in the reverse direction;

a second capacitor including a first electrode connected to the third node and a second electrode connected to the reference node to which a reference voltage ins applied;

a third selection switching element connected between the reference node and the second electrode of the second capacitor, and selectively connecting the second electrode of the second capacitor to the reference node and the second output switching element;

a second compensation capacitor including a first electrode connected to the third node and a second electrode connected to the reference node;

a fourth selection switching element connected between the third node and the first electrode of the second compensation capacitor, and controlling a connection of the third node and the first electrode of the second compensation capacitor; and a second reset switching element controlling a connection of the third node and the reference node.

16. The input sensor of claim 2, further comprising:

a first reset switching element connected between the second node and the reference node, and turned on by a first reset signal to reset the first rectifier circuit to a reference voltage; and a second switching element connected between the third node and the reference node, and turned on by a second reset signal to reset the second rectifier circuit to the reference voltage.

17. The input sensor of claim 16, wherein, in a threshold voltage measurement period, after the first and second rectifier circuits are simultaneously reset by the first and second reset switching elements, the first voltage and the second voltage are applied to the first and second rectifier circuits.

18. The input sensor of claim 17, wherein, in a sensing period following the threshold voltage measurement period, an output voltage of the amplifier circuit is applied to the first rectifier circuit and the second rectifier circuit, the first rectifier circuit is reset by the first reset switching element after an output of the first rectifier circuit is provided to the analog-to-digital converter to convert the output of the first rectifier circuit into a first digital signal, and the second rectifier circuit is reset by the second reset switching element after an output of the second rectifier circuit is provided to the analog-to-digital converter to convert the output of the second rectifier circuit into a second digital signal.

19. The input sensor of claim 1, further comprising:
a noise filter disposed between the amplifier circuit and the first connection switching element.

20. A driving method of an input sensor comprising:

charging a first voltage in a first capacitor through a first diode connected in a forward direction;

outputting a first compensation voltage charged in the first capacitor as a first compensation digital signal;

storing a first threshold value obtained by subtracting a first voltage value defined as a digital value of the first voltage from the first compensation digital signal;

charging a second voltage lower than the first voltage in a second capacitor through a second diode connected in a reverse direction;

outputting a second compensation voltage charged in the second capacitor as a second compensation digital signal;

storing a second threshold value obtained by subtracting a second voltage value defined as a digital value of the second voltage from the second compensation digital signal;

charging a positive-polarity voltage of an amplified input voltage in the first capacitor through the first diode;

discharging the first capacitor and the second capacitor to a reference voltage;

outputting a first charging voltage charged in the first capacitor as a first digital signal;

subtracting the first threshold value from the first digital signal and outputting a result of the subtraction;

charging a negative-polarity voltage of the amplified input voltage in the second capacitor through the second diode;

outputting a second charging voltage charged in the second capacitor as a second digital signal; and subtracting the second threshold value from the second digital signal and outputting a result of the subtraction.

* * * * *